US012675554B2

(12) United States Patent
   Okamoto

(10) Patent No.: US 12,675,554 B2
(45) Date of Patent: Jul. 7, 2026

(54) INFORMATION PROCESSING METHOD, INFORMATION PROCESSING APPARATUS, AND NON-TRANSITORY COMPUTER-READABLE STORAGE MEDIUM

(71) Applicant: Actapio, Inc., East Wenatchee, WA (US)

(72) Inventor: Shinichiro Okamoto, Wenatchee, WA (US)

(73) Assignee: Actapio, Inc., East Wenatchee, WA (US)

( * ) Notice: Subject to any disclaimer, the term of this patent is extended or adjusted under 35 U.S.C. 154(b) by 775 days.

(21) Appl. No.: 18/078,487

(22) Filed: Dec. 9, 2022

(65) Prior Publication Data

US 2024/0012881 A1     Jan. 11, 2024

Related U.S. Application Data

(60) Provisional application No. 63/388,001, filed on Jul. 11, 2022.

(51) Int. Cl.
   *G06F 18/25*        (2023.01)
   *G06F 18/211*       (2023.01)
   *G06N 3/02*         (2006.01)

(52) U.S. Cl.
   CPC ............ *G06F 18/25* (2023.01); *G06F 18/211* (2023.01); *G06N 3/02* (2013.01)

(58) Field of Classification Search
   CPC ......... G06F 18/25; G06F 18/211; G06N 3/10; G06N 3/045; G06N 3/0985; G06N 3/02;
   (Continued)

(56) References Cited

U.S. PATENT DOCUMENTS 11,699,095 B2 *   7/2023  Kanagawa .............  G06N 3/048
                                                   706/12
11,928,737 B1 *   3/2024  Behrens ...................  G06N 3/09
                          (Continued)

FOREIGN PATENT DOCUMENTS

EP          3690558 A1 *  8/2020  .............  G06N 3/045
JP      2009-146149 A       7/2009
                     (Continued)

OTHER PUBLICATIONS

X. Sun, Q. Liu and L. Zhang, "A BP Neural Network Model Based on Genetic Algorithm for Comprehensive Evaluation," 2011 Third Pacific-Asia Conference on Circuits, Communications and System (PACCS), Wuhan, China, 2011, pp. 1-5.*
                     (Continued)

*Primary Examiner* — Pierre Michel Bataille
(74) *Attorney, Agent, or Firm* — PROCOPIO, CORY, HARGREAVES & SAVITCH LLP

(57)                    ABSTRACT

An information processing method including: acquiring learning data used for learning of a model having a plurality of blocks including a first block to which an output from a first input layer is input and a second block to which an output from a second input layer different from the first input layer is input, the learning data including a plurality of types of information; and selecting a type included in data input to each of the plurality of blocks in learning using the learning data, and generating the model by using first data in which a combination of types selected among the plurality of types is a first combination as an input from the first input layer to the first block and second data in which a combination of types selected is a second combination as an input from the second input layer to the second block.

10 Claims, 13 Drawing Sheets

(58) Field of Classification Search
     CPC ........ G06N 3/082; G06N 3/086; G06N 20/10;
                 G06N 3/0464; G06N 3/0442; G06N 3/04
     See application file for complete search history.

(56)                    References Cited

U.S. PATENT DOCUMENTS

2015/0356184 A1* 12/2015 Solomakha ......... G06F 16/9535
                                                  707/734
2019/0122099 A1*  4/2019 Dung ..................... G06N 3/082
2020/0005136 A1*  1/2020 Spryn ................... G06N 3/045
2020/0349444 A1* 11/2020 Yaguchi ................ G06N 3/084
2021/0264259 A1*  8/2021 Kato ........................ G06N 5/04
2024/0193785 A1*  6/2024 Hasegawa ............. G06V 10/82

FOREIGN PATENT DOCUMENTS

JP          2016-99764 A      5/2016
JP         2020-125694 A      8/2020
JP         2021-168042 A     10/2021

OTHER PUBLICATIONS

Japanese Patent Office, Office Action, Application No. 2022-
186943, dated Jan. 5, 2023, on 8 pages.

* cited by examiner

| DATA SET ID | DATA ID | DATA | ... |
|---|---|---|---|
| DS1 | DID1 | DT1 | ... |
| | DID2 | DT2 | ... |
| | DID3 | DT3 | ... |
| | DID4 | DT4 | ... |
| | DID5 | DT5 | ... |
| | DID6 | DT6 | ... |
| | DID7 | DT7 | ... |
| | DID8 | DT8 | ... |
| | ... | ... | ... |
| ... | ... | ... | ... |

FIG.5

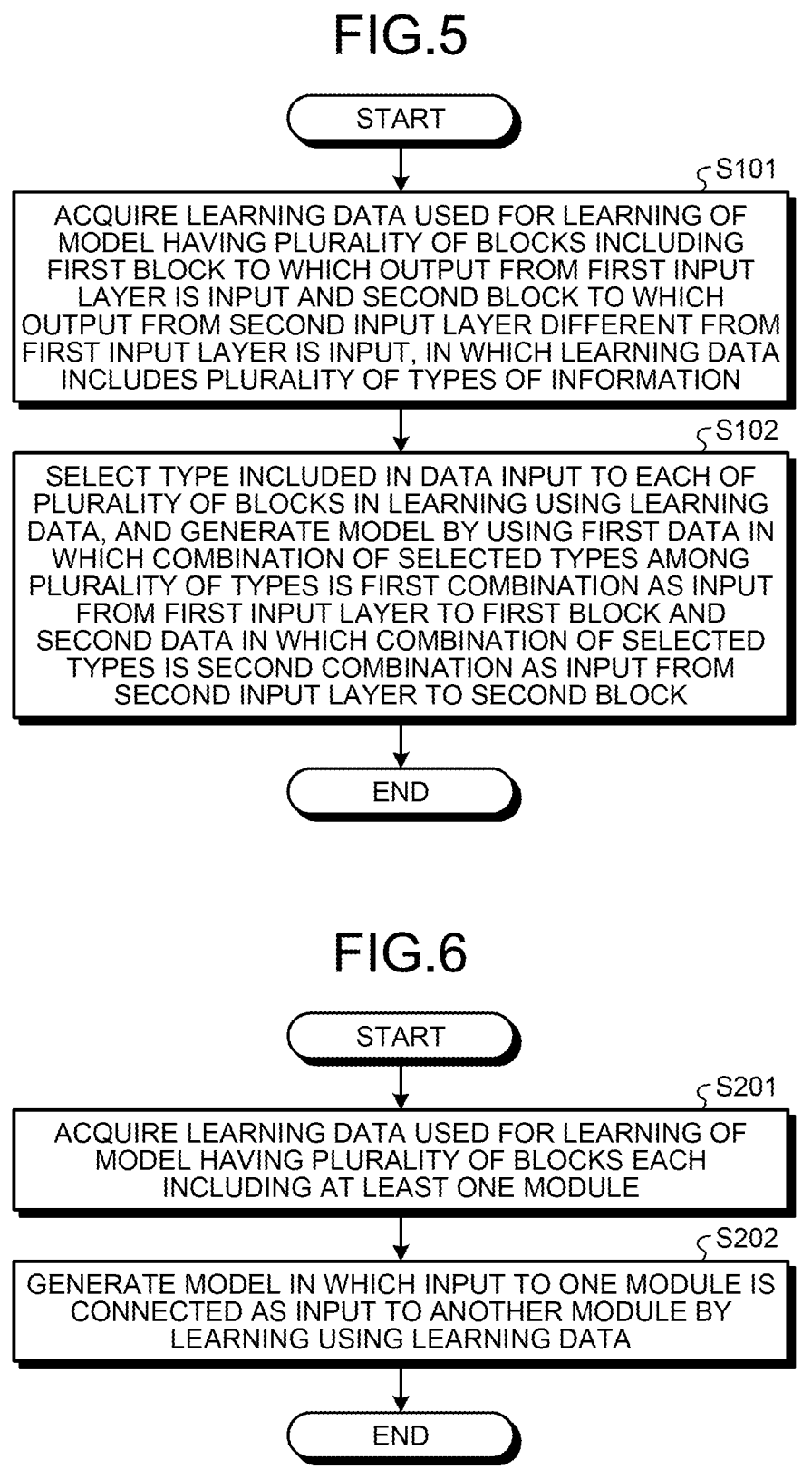

START

S101

ACQUIRE LEARNING DATA USED FOR LEARNING OF MODEL HAVING PLURALITY OF BLOCKS INCLUDING FIRST BLOCK TO WHICH OUTPUT FROM FIRST INPUT LAYER IS INPUT AND SECOND BLOCK TO WHICH OUTPUT FROM SECOND INPUT LAYER DIFFERENT FROM FIRST INPUT LAYER IS INPUT, IN WHICH LEARNING DATA INCLUDES PLURALITY OF TYPES OF INFORMATION

S102

SELECT TYPE INCLUDED IN DATA INPUT TO EACH OF PLURALITY OF BLOCKS IN LEARNING USING LEARNING DATA, AND GENERATE MODEL BY USING FIRST DATA IN WHICH COMBINATION OF SELECTED TYPES AMONG PLURALITY OF TYPES IS FIRST COMBINATION AS INPUT FROM FIRST INPUT LAYER TO FIRST BLOCK AND SECOND DATA IN WHICH COMBINATION OF SELECTED TYPES IS SECOND COMBINATION AS INPUT FROM SECOND INPUT LAYER TO SECOND BLOCK

END

FIG.6

START

S201

ACQUIRE LEARNING DATA USED FOR LEARNING OF MODEL HAVING PLURALITY OF BLOCKS EACH INCLUDING AT LEAST ONE MODULE

S202

GENERATE MODEL IN WHICH INPUT TO ONE MODULE IS CONNECTED AS INPUT TO ANOTHER MODULE BY LEARNING USING LEARNING DATA

END

FIG.7

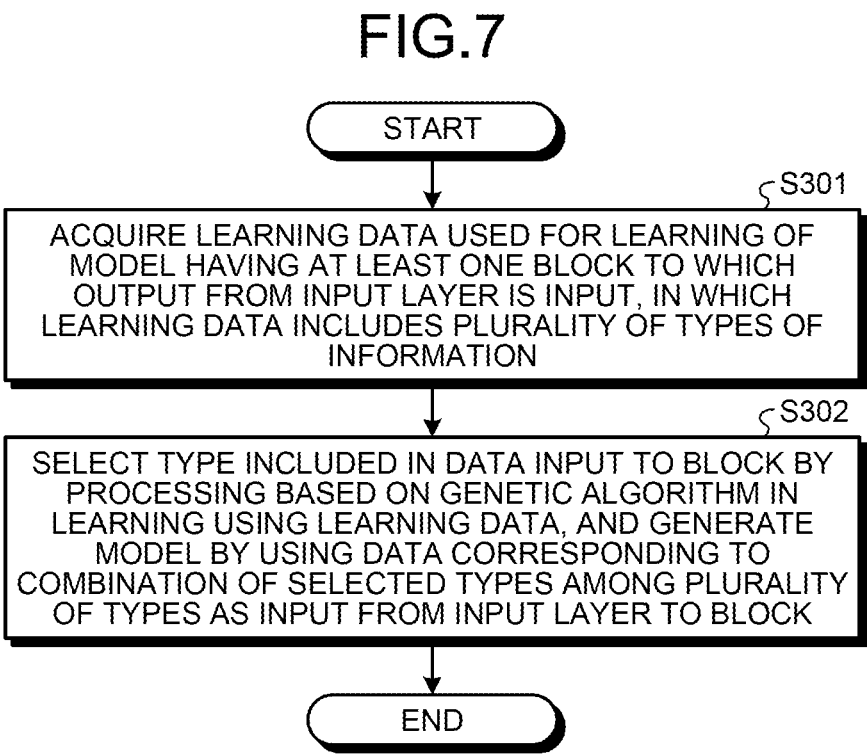

START

S301

ACQUIRE LEARNING DATA USED FOR LEARNING OF MODEL HAVING AT LEAST ONE BLOCK TO WHICH OUTPUT FROM INPUT LAYER IS INPUT, IN WHICH LEARNING DATA INCLUDES PLURALITY OF TYPES OF INFORMATION

S302

SELECT TYPE INCLUDED IN DATA INPUT TO BLOCK BY PROCESSING BASED ON GENETIC ALGORITHM IN LEARNING USING LEARNING DATA, AND GENERATE MODEL BY USING DATA CORRESPONDING TO COMBINATION OF SELECTED TYPES AMONG PLURALITY OF TYPES AS INPUT FROM INPUT LAYER TO BLOCK

END

FIG.8

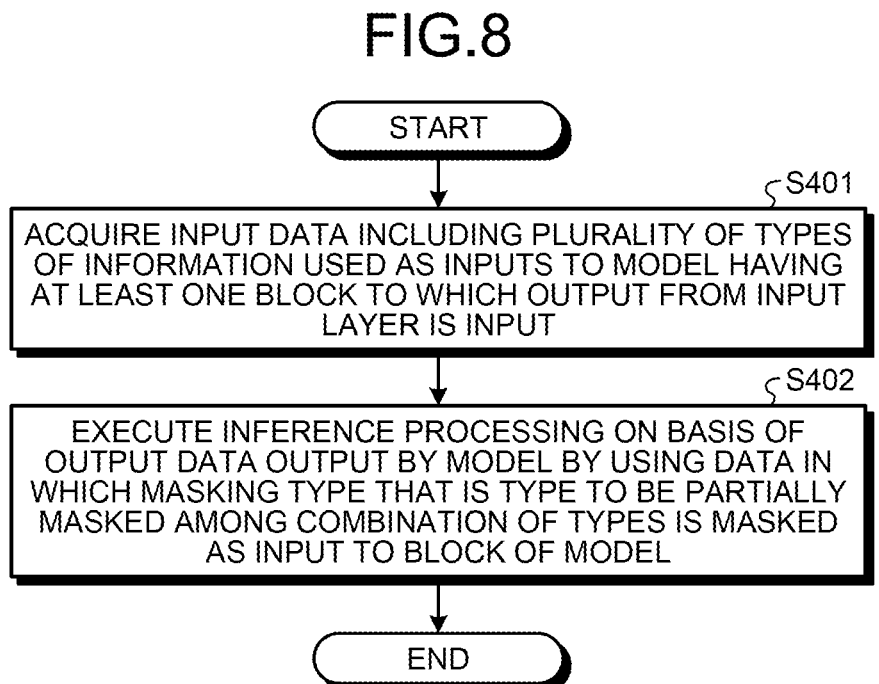

START

S401

ACQUIRE INPUT DATA INCLUDING PLURALITY OF TYPES OF INFORMATION USED AS INPUTS TO MODEL HAVING AT LEAST ONE BLOCK TO WHICH OUTPUT FROM INPUT LAYER IS INPUT

S402

EXECUTE INFERENCE PROCESSING ON BASIS OF OUTPUT DATA OUTPUT BY MODEL BY USING DATA IN WHICH MASKING TYPE THAT IS TYPE TO BE PARTIALLY MASKED AMONG COMBINATION OF TYPES IS MASKED AS INPUT TO BLOCK OF MODEL

END

FIG.11

| TYPE BLOCK | TYPE #1 | TYPE #2 | TYPE #3 | TYPE #4 | ... |
|---|---|---|---|---|---|
| BL1 | 0 | 1 | - | - | ... |
| BL2 | 1 | - | - | 0 | ... |
| BL3 | 0 | 2 | - | - | ... |
| BL4 | 2 | 3 | - | 2 | ... |
| ... | ... | ... | ... | ... | ... |

FIG.12

```
INPUT_FEATURE
searchInputFeatureKeepFeatureConfigs: 2
```

FIG.13

```
ARCHITECTURE
searchModelKeepHiddenBlocks: 2
```

FIG.14

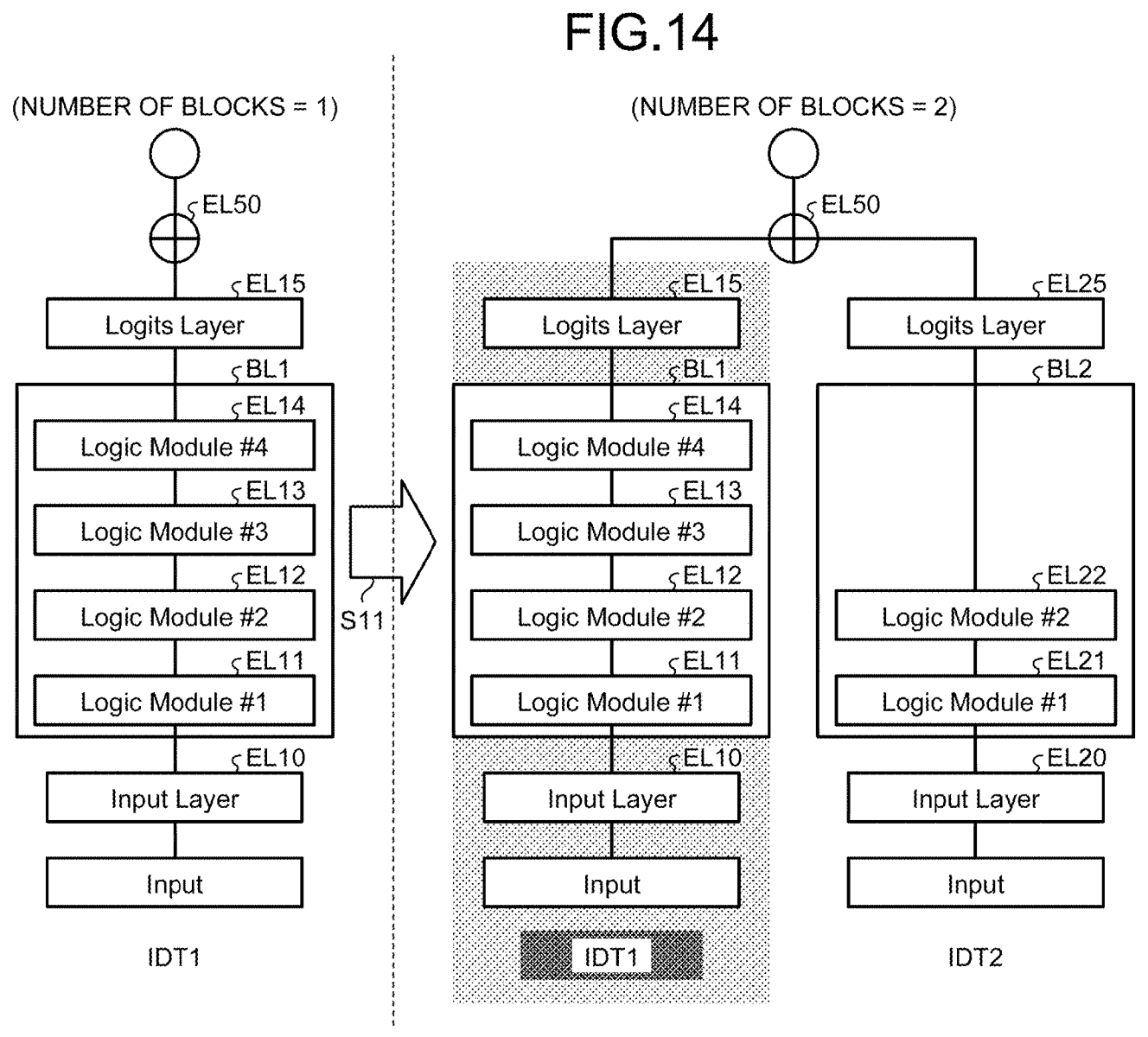

(NUMBER OF BLOCKS = 2)

EL25
Logits Layer
BL2
EL22
Logic Module #2
EL21
Logic Module #1
EL20
Input Layer
Input
IDT2

EL50

EL15
Logits Layer
BL1
EL14
Logic Module #4
EL13
Logic Module #3
EL12
Logic Module #2
EL11
Logic Module #1
EL10
Input Layer
Input
IDT1

S11

(NUMBER OF BLOCKS = 1)

EL50

EL15
Logits Layer
BL1
EL14
Logic Module #4
EL13
Logic Module #3
EL12
Logic Module #2
EL11
Logic Module #1
EL10
Input Layer
Input
IDT1

| No. | Dataset | CONVENTIONAL EXAMPLE #1 | PRESENT TECHNIQUE | Performance Improvement Rate |
|---|---|---|---|---|
| | | OFFLINE INDEX #1 | OFFLINE INDEX #1 | |
| 1 | DATA SET #1 (Service A) | 0.35335 | 0.48592 | +37.6% |
| 2 | DATA SET #2 (Service B) | 0.13294 | 0.16565 | +24.6% |
| 3 | DATA SET #3 (Service C) | 0.10823 | 0.13316 | +23.0% |
| 4 | DATA SET #4 (Service D) | 0.18763 | 0.23328 | +24.3% |

| No. | Dataset | CONVENTIONAL EXAMPLE #1 | PRESENT TECHNIQUE | Performance Improvement Rate |
|-----|---------|-------------------------|-------------------|------------------------------|
|     |         | AUC | AUC |  |
| 1 | DATA SET #5 (Service E) | 0.7812 | 0.7846 | +0.44% |
| 2 | DATA SET #6 (Service F) | 0.8484 | 0.8545 | +0.72% |

INFORMATION PROCESSING METHOD, INFORMATION PROCESSING APPARATUS, AND NON-TRANSITORY COMPUTER-READABLE STORAGE MEDIUM

TECHNICAL FIELD

The present invention relates to an information processing method, an information processing apparatus, and a non-transitory computer-readable storage medium having stored therein an information processing program.

BACKGROUND ART

In recent years, techniques of generating models by causing various models such as a neural network such as a deep neural network (DNN) to learn features included in learning data have been proposed. In addition, generated models are used for various inference processing such as various predictions and classifications.

[Patent Literature 1] JP 2021-168042 A

DISCLOSURE OF INVENTION

Problem to be Solved by the Invention

The above-described techniques have room for improvement in generation of models. For example, in the above-described example, a model having a configuration in which modules (layers) are connected in series is merely generated, and it is desired to generate a model more flexibly. For example, for a model having a plurality of blocks, it is desired to generate a model that can more flexibly use input data.

Means for Solving Problem

An information processing method according to the present application is an information processing method executed by a computer, the information processing method comprising: acquiring learning data used for learning of a model having a plurality of blocks including a first block to which an output from a first input layer is input and a second block to which an output from a second input layer different from the first input layer is input, the learning data including a plurality of types of information; and selecting a type included in data input to each of the plurality of blocks in learning using the learning data, and generating the model by using first data in which a combination of types selected among the plurality of types is a first combination as an input from the first input layer to the first block and second data in which a combination of types selected is a second combination as an input from the second input layer to the second block.

Effect of the Invention

According to an aspect of the embodiment, it is possible to generate a model that can flexibly use input data.

BRIEF DESCRIPTION OF DRAWINGS

FIG. 4 is a diagram illustrating an example of information registered in a learning database according to the embodiment;

FIG. 5 is a flowchart illustrating an example of a flow of information processing according to the embodiment;

FIG. 6 is a flowchart illustrating an example of a flow of information processing according to the embodiment;

FIG. 7 is a flowchart illustrating an example of a flow of information processing according to the embodiment;

FIG. 8 is a flowchart illustrating an example of a flow of information processing according to the embodiment;

FIG. 11 is a diagram illustrating an example of a combination of inputs according to the embodiment;

FIG. 12 is a diagram illustrating an example of parameters according to the embodiment;

FIG. 13 is a diagram illustrating an example of parameters according to the embodiment;

FIG. 14 is a diagram illustrating an example of model generation processing according to the embodiment;

BEST MODE(S) OF CARRYING OUT THE INVENTION

Figure 1:
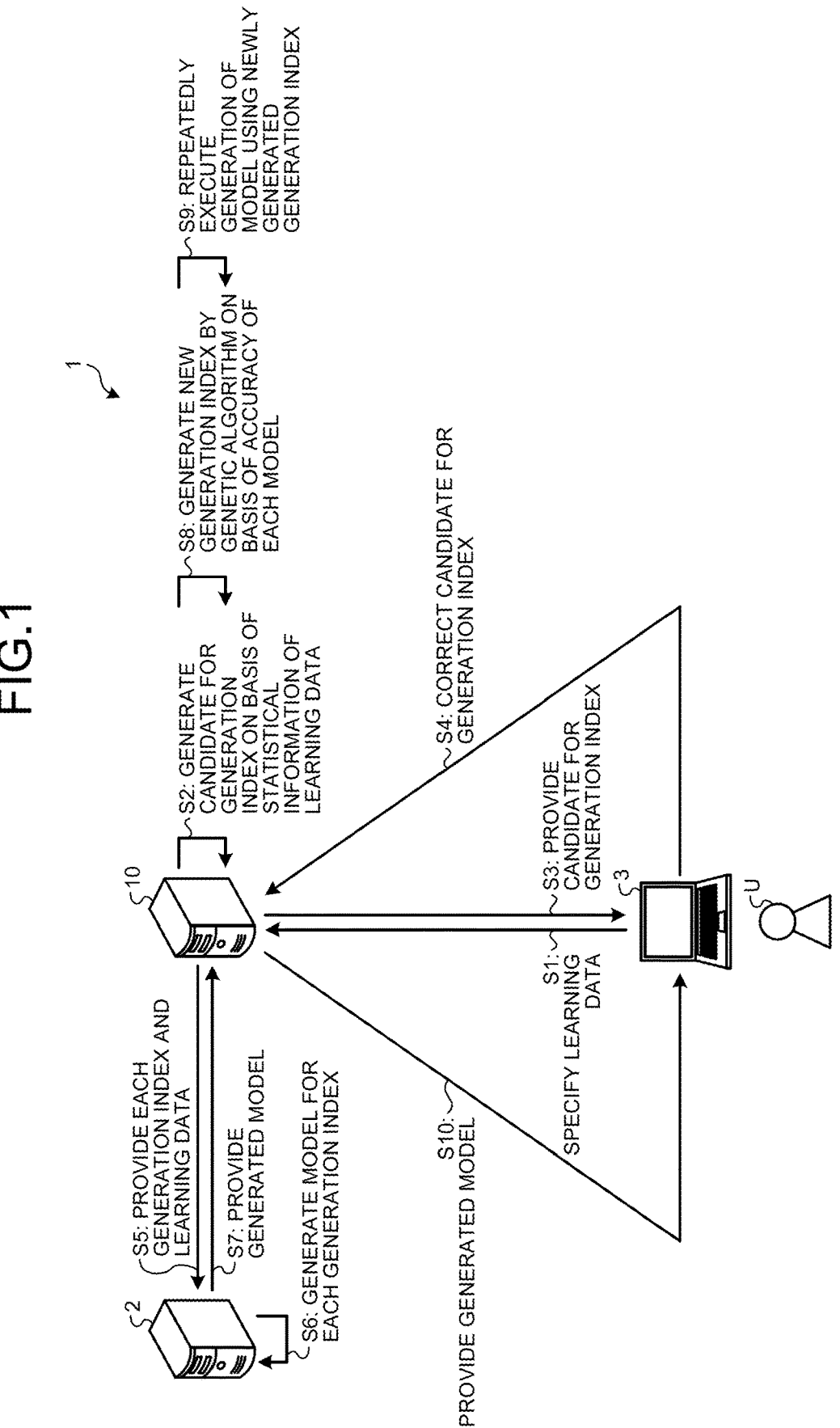
FIG. 1 is a diagram illustrating an example of an information processing system according to an embodiment.

Hereinafter, modes (hereinafter referred to as "embodiments") for implementing an information processing method, an information processing apparatus, and a non-transitory computer-readable storage medium having stored therein an information processing program according to the present application will be described in detail with reference to the drawings. Note that the information processing method, the information processing apparatus, and the information processing program according to the present application are not limited by the embodiments. In addition, each embodiment can be appropriately combined within a range in which the processing contents do not contradict each other. In the following embodiments, the same parts are denoted by the same reference numerals, and redundant description will be omitted.

EMBODIMENTS

In the following embodiments, first, preconditions of a system configuration and the like will be described, and then, processing for generating a model by performing processing based on a genetic algorithm in learning at the time of generating a model having at least one block including at least one module will be described. Note that, although details of blocks and modules to be components of the model will be described later, for example, a block constitutes a part of the model (also referred to as a "partial model"). In addition, a module is an element of a functional unit for implementing a function implemented by a block, for example. In the present embodiment, a configuration and the like of an information processing system 1 that generates a model will be first described before the generation of the model, the experimental results, and the like described above are illustrated.

1. Configuration of Information Processing System

First, a configuration of an information processing system including an information processing apparatus 10 which is an example of an information processing apparatus will be described with reference to FIG. 1. FIG. 1 is a diagram illustrating an example of an information processing system according to an embodiment. As illustrated in FIG. 1, the information processing system 1 includes an information processing apparatus 10, a model generation server 2, and a terminal device 3. Note that the information processing system 1 may include a plurality of model generation servers 2 and a plurality of terminal devices 3. Furthermore, the information processing apparatus 10 and the model generation server 2 may be implemented by the same server device, cloud system, or the like. Here, the information processing apparatus 10, the model generation server 2, and the terminal device 3 are communicably connected in a wired or wireless manner via a network N (see, for example, FIG. 3).

The information processing apparatus 10 is an information processing apparatus that executes index generation processing of generating a generation index that is an index (that is, the recipe of the model) in model generation and model generation processing of generating a model in accordance with the generation index and provides the generated generation index and the model, and is implemented by, for example, a server device, a cloud system, or the like.

The model generation server 2 is an information processing apparatus that generates a model in which features included in learning data are learned, and is implemented by, for example, a server device, a cloud system, or the like. For example, when the model generation server 2 receives, as a model generation index, a configuration file such as the type and behavior of the model to be generated and how to learn the feature of the learning data, the model generation server 2 automatically generates the model according to the received configuration file. Note that the model generation server 2 may learn the model using an arbitrary model learning method. Furthermore, for example, the model generation server 2 may be various existing services such as automated machine learning (AutoML).

The terminal device 3 is a terminal device used by a user U, and is implemented by, for example, a personal computer (PC), a server device, or the like. For example, the terminal device 3 generates a model generation index through communication with the information processing apparatus 10, and acquires the model generated by the model generation server 2 according to the generated generation index.

2. Outline of Processing Executed by Information Processing Apparatus 10

First, an outline of processing executed by the information processing apparatus 10 will be described. First, the information processing apparatus 10 receives an indication of learning data for causing a model to learn a feature from the terminal device 3 (Step S1). For example, the information processing apparatus 10 stores various kinds of learning data used for learning in a predetermined storage device, and accepts indication of the learning data specified as the learning data by the user U. Note that the information processing apparatus 10 may acquire learning data used for learning from the terminal device 3 or various external servers, for example.

Here, as the learning data, arbitrary data can be adopted. For example, the information processing apparatus 10 may use various types of information regarding the user, such as a history of the position of each user, a history of web content browsed by each user, a purchase history by each user, and a history of a search query, as the learning data. Furthermore, the information processing apparatus 10 may use demographic attributes, psychographic attributes, and the like of the user as the learning data. Furthermore, the information processing apparatus 10 may use, as the learning data, a type or content of various kinds of web content to be distributed, metadata of a creator or the like, or the like.

In such a case, the information processing apparatus 10 generates a candidate for a generation index on the basis of statistical information of learning data used for learning (Step S2). For example, the information processing apparatus 10 generates a candidate for a generation index indicating what kind of model and what kind of learning method should be used to perform learning on the basis of features of values included in the learning data or the like. In other words, the information processing apparatus 10 generates a model capable of accurately learning a feature of learning data or a learning method for causing a model to accurately learn a feature as a generation index. That is, the information processing apparatus 10 optimizes the learning method. Note that what kind of content of the generation index is generated in a case where what kind of learning data is selected will be described later.

Subsequently, the information processing apparatus 10 provides a candidate for the generation index to the terminal device 3 (Step S3). In such a case, the user U corrects the candidate for the generation index according to the preference, the empirical rule, or the like (Step S4). Then, the information processing apparatus 10 provides the candidate for each generation index and the learning data to the model generation server 2 (Step S5).

Meanwhile, the model generation server 2 generates a model for each generation index (Step S6). For example, the model generation server 2 causes the model having the structure indicated by the generation index to learn the feature included in the learning data by the learning method indicated by the generation index. Then, the model generation server 2 provides the generated model to the information processing apparatus 10 (Step S7).

Here, it is considered that each model generated by the model generation server 2 has a difference in accuracy derived from a difference in generation index. Therefore, the information processing apparatus 10 generates a new generation index by a genetic algorithm on the basis of the accuracy of each model (Step S8), and repeatedly executes generation of a model using the newly generated generation index (Step S9).

For example, the information processing apparatus 10 divides the learning data into evaluation data and data for learning, and acquires a plurality of models that have learned the features of the data for learning and are generated according to different generation indexes. For example, the information processing apparatus 10 generates ten generation indexes, and generates ten models by using the generated ten generation indexes and the data for learning. In such a case, the information processing apparatus 10 measures the accuracy of each of the ten models using the evaluation data.

Subsequently, the information processing apparatus 10 selects a predetermined number of models (for example, five) in descending order of accuracy from among the ten models. Then, the information processing apparatus 10 generates a new generation index from the generation index adopted when the selected five models are generated. For example, the information processing apparatus 10 considers each generation index as an individual of the genetic algorithm, and considers the type of the model, the structure of the model, and various learning methods (that is, various indexes indicated by the generation index) indicated by each generation index as genes in the genetic algorithm. Then, the information processing apparatus 10 newly generates ten next-generation generation indexes by selecting an individual to perform gene crossing-over and performing gene crossing-over. Note that the information processing apparatus 10 may consider mutation when performing gene crossing-over. Furthermore, the information processing apparatus 10 may perform two-point crossing-over, multi-point crossing-over, uniform crossing-over, and random selection of a gene to be a crossing-over target. Furthermore, for example, the information processing apparatus 10 may adjust the crossing-over rate at the time of performing crossing-over such that a gene of an individual having higher model accuracy is taken over to a next generation individual.

Furthermore, the information processing apparatus 10 generates new ten models again using the next generation index. Then, the information processing apparatus 10 generates a new generation index by the genetic algorithm described above on the basis of the accuracy of the new ten models. By repeatedly executing such processing, the information processing apparatus 10 can bring the generation index closer to the generation index according to the feature of the learning data, that is, the optimized generation index.

Furthermore, in a case where a predetermined condition is satisfied, such as a case where a new generation index is generated a predetermined number of times or a case where the maximum value, the average value, or the minimum value of the accuracy of the model exceeds a predetermined threshold value, the information processing apparatus 10 selects the model with the highest accuracy as the provision target. Then, the information processing apparatus 10 provides the corresponding generation index to the terminal device 3 together with the selected model (Step S10). As a result of such processing, the information processing apparatus 10 can generate an appropriate model generation index and provide a model according to the generated generation index only by selecting learning data from the user.

Note that, in the above-described example, the information processing apparatus 10 achieve stepwise optimization of the generation index using the genetic algorithm, but the embodiment is not limited thereto. As will be apparent in the following description, the accuracy of the model greatly changes depending on an index at the time of generating the model (that is, when the feature of the learning data are learned), such as how and what kind of learning data is input to the model and what kind of hyperparameter is used to learn the model, in addition to the features of the model itself such as the type and structure of the model.

Therefore, the information processing apparatus 10 may not perform the optimization using the genetic algorithm as long as the generation index estimated to be optimal is generated according to the learning data. For example, the information processing apparatus 10 may present the generation index generated according to whether or not the learning data satisfies various conditions generated according to the empirical rule to the user, and generate the model according to the presented generation index. Furthermore, when accepting the correction of the presented generation index, the information processing apparatus 10 may generate a model according to the received generation index after the correction, present the accuracy or the like of the generated model to the user, and accept the correction of the generation index again. That is, the information processing apparatus 10 may cause the user U to perform trial and error of an optimal generation index.

3. Generation of Generation Index

Hereinafter, an example of what kind of generation index is generated for what kind of learning data will be described. Note that the following example is merely an example, and any processing can be adopted as long as the generation index is generated according to the feature of the learning data.

3-1. Generation Index

First, an example of information indicated by a generation index will be described. For example, in a case where a feature included in learning data is learned by a model, it is considered that a mode when the learning data is input to the model, a mode of the model, and a learning mode of the model (that is, the feature indicated by the hyperparameter) contribute to the accuracy of the finally obtained model. Therefore, the information processing apparatus 10 improves the accuracy of the model by generating the generation index in which each mode is optimized according to the feature of the learning data.

For example, it is considered that the learning data includes data to which various labels are given, that is, data indicating various features. However, when data indicating a feature that is not useful in classifying data is used as learning data, the accuracy of a finally obtained model may deteriorate. Therefore, the information processing apparatus 10 determines the feature included in the learning data to be input as a mode when the learning data is input to the model. For example, the information processing apparatus 10 determines which labeled data (that is, data indicating which feature) is to be input among the learning data. In other words, the information processing apparatus 10 optimizes a combination of features to be input.

In addition, it is considered that the learning data includes various types of columns such as data including only numerical values and data including character strings. When such learning data is input to the model, it is considered that the accuracy of the model changes between a case where the learning data is input as it is and a case where the learning data is converted into data of another format. For example, when a plurality of types of learning data (learning data indicating different features), that is, learning data of character strings and learning data of numerical values are input, the accuracy of the model is considered to change between a case where the character strings and the numerical values are input as they are, a case where the character strings are converted into numerical values and only numerical values are input, and a case where numerical values are regarded as character strings and input. Therefore, the information processing apparatus 10 determines the format of the learning data to be input to the model. For example, the information processing apparatus 10 determines whether the learning data to be input to the model is numerical values or character strings. In other words, the information processing apparatus 10 optimizes the column type of the input feature.

Furthermore, in a case where there is learning data indicating different features, it is considered that the accuracy of the model changes depending on which combination of features is simultaneously input. That is, in a case where there is learning data indicating different features, it is considered that the accuracy of the model changes depending on which features of a combination of features (that is, a relationship between combinations of a plurality of features) are learned. For example, in a case where there are learning data indicating a first feature (for example, gender), learning data indicating a second feature (for example, address), and learning data indicating a third feature (for example, purchase history), it is considered that the accuracy of the model changes between a case where the learning data indicating the first feature and the learning data indicating the second feature are simultaneously input and a case where the learning data indicating the first feature and the learning data indicating the third feature are simultaneously input. Therefore, the information processing apparatus 10 optimizes a combination (cross feature) of features for causing the model to learn the relationship.

Here, various models project input data into a predetermined dimensional space divided by a predetermined hyperplane, and classify the input data according to which space the projected position belongs among the divided spaces. Therefore, in a case where the number of dimensions of the space on which the input data is projected is lower than the optimum number of dimensions, the classification ability of the input data deteriorates, and as a result, the accuracy of the model deteriorates. In addition, in a case where the number of dimensions of the space on which the input data is projected is higher than the optimum number of dimensions, the inner product value with the hyperplane changes, and as a result, data different from the data used at the time of learning may not be appropriately classified. Therefore, the information processing apparatus 10 optimizes the number of dimensions of the input data input to the model. For example, the information processing apparatus 10 optimizes the number of dimensions of the input data by controlling the number of nodes of the input layer included in the model. In other words, the information processing apparatus 10 optimizes the number of dimensions of the space in which the input data is embedded.

In addition, the model includes a neural network having a plurality of intermediate layers (hidden layers) in addition to the SVM. Furthermore, as such a neural network, various neural networks are known, such as a feedforward type DNN in which information is transmitted in one direction from an input layer to an output layer, a convolutional neural network (CNN) in which convolution of information is performed in an intermediate layer, a recurrent neural network (RNN) having an oriented closed circuit, and a Boltzmann machine. Such various neural networks include a long short-term memory (LSTM) and other various neural networks.

As described above, in a case where the types of models for learning various features of the learning data are different, it is considered that the accuracy of the model changes. Therefore, the information processing apparatus 10 selects the type of the model estimated to accurately learn the feature of the learning data. For example, the information processing apparatus 10 selects the type of model according to what kind of label is given as the label of the learning data. More specifically, the information processing apparatus 10 selects an RNN that is considered to be able to learn the feature of the history better in a case where there is data to which a term related to "history" is attached as a label, and selects a CNN that is considered to be able to learn the feature of the image better in a case where there is data to which a term related to "image" is attached as a label. In addition to these, the information processing apparatus 10 may determine whether or not the label is a term designated in advance or a term similar to the term, and select a model of a type associated in advance with a term determined to be the same or similar.

In addition, when the number of intermediate layers of the model or the number of nodes included in one intermediate layer changes, it is considered that the learning accuracy of the model changes. For example, in a case where the number of intermediate layers of the model is large (in a case where the model is deep), it is considered that classification according to a more abstract feature can be implemented, but there is a possibility that learning cannot be appropriately performed as a result of difficulty in propagation of a local error in back propagation to the input layer. In addition, in a case where the number of nodes included in the intermediate layers is small, abstraction can be performed at a higher level, but in a case where the number of nodes is too small, there is a high possibility that information necessary for classification is lost. Therefore, the information processing apparatus 10 optimizes the number of intermediate layers and the number of nodes included in the intermediate layers. That is, the information processing apparatus 10 optimizes the architecture of the model.

In addition, it is considered that the accuracy of the nodes changes depending on the presence or absence of attention and whether or not the nodes included in the model has autoregressive behavior, and which nodes are connected. Therefore, the information processing apparatus 10 optimizes the network such as whether or not there is autoregressive and which nodes are connected.

In addition, in the case of performing model learning, a model optimization method (algorithm used at the time of learning), a dropout rate, an activation function of a node, the number of units, and the like are set as hyperparameters. Even when such hyperparameters change, it is considered that the accuracy of the model changes. Therefore, the information processing apparatus 10 optimizes the learning mode at the time of learning the model, that is, the hyperparameters.

In addition, when the size (the number of input layers, intermediate layers, and output layers and the number of nodes) of the model changes, the accuracy of the model also changes. Therefore, the information processing apparatus 10 also optimizes the size of the model.

In this manner, the information processing apparatus 10 optimizes the indexes when generating the various models described above. For example, the information processing apparatus 10 holds a condition corresponding to each index in advance. Note that such a condition is set by, for example, an empirical rule such as accuracy of various models generated from past learning models. Then, the information processing apparatus 10 determines whether or not the learning data satisfies each condition, and adopts an index associated in advance with a condition that the learning data satisfies or does not satisfy as the generation index (or a candidate thereof). As a result, the information processing apparatus 10 can generate the generation index capable of accurately learning the feature included in the learning data.

Note that, as described above, in a case where the processing of automatically generating the generation index from the learning data and creating the model according to the generation index is automatically performed, the user may not refer to the inside of the learning data and determine what kind of distribution data exists. As a result, for example, the information processing apparatus 10 can reduce time and effort for the data scientist and the like to recognize the learning data in association with the creation of the model, and can prevent damage to privacy in association with the recognition of the learning data.

3-2. Generation Index According to Data Type

Hereinafter, an example of a condition for generating the generation index will be described. First, an example of a condition according to what kind of data is adopted as learning data will be described.

For example, the learning data used for learning includes an integer, a floating point, a character string, or the like as data. Therefore, in a case where an appropriate model is selected for the format of the input data, it is estimated that the learning accuracy of the model becomes higher. Therefore, the information processing apparatus 10 generates the generation index on the basis of whether the learning data is an integer, a floating point, or a character string.

For example, in a case where the learning data is an integer, the information processing apparatus 10 generates the generation index on the basis of the continuity of the learning data. For example, in a case where the density of the learning data exceeds a predetermined first threshold value, the information processing apparatus 10 considers that the learning data is data having continuity, and generates the generation index on the basis of whether or not the maximum value of the learning data exceeds a predetermined second threshold value. Furthermore, in a case where the density of the learning data is lower than the predetermined first threshold value, the information processing apparatus 10 considers that the learning data is sparse learning data, and generates the generation index on the basis of whether or not the number of unique values included in the learning data exceeds the predetermined third threshold value.

A more specific example will be described. Note that, in the following example, an example of processing of selecting a feature function from configuration files to be transmitted to the model generation server 2 that automatically generates a model by AutoML as a generation index will be described. For example, in a case where the learning data is an integer, the information processing apparatus 10 determines whether or not the density exceeds a predetermined first threshold value. For example, the information processing apparatus 10 calculates, as the density, a value obtained by dividing the number of unique values among the values included in the learning data by a value obtained by adding 1 to the maximum value of the learning data.

Subsequently, in a case where the density exceeds the predetermined first threshold value, the information processing apparatus 10 determines that the learning data is learning data having continuity, and determines whether or not a value obtained by adding 1 to the maximum value of the learning data exceeds the second threshold value. Then, in a case where the value obtained by adding 1 to the maximum value of the learning data exceeds the second threshold value, the information processing apparatus 10 selects "Categorical_colum_with_identity & embedding_column" as the feature function. Meanwhile, in a case where the value obtained by adding 1 to the maximum value of the learning data is less than the second threshold value, the information processing apparatus 10 selects "Categorical_column_with-_identity" as the feature function.

Meanwhile, in a case where the density is lower than the predetermined first threshold value, the information processing apparatus 10 determines that the learning data is sparse, and determines whether or not the number of unique values included in the learning data exceeds a predetermined third threshold value. Then, the information processing apparatus 10 selects "Categorical_column_with_hash_bucket & embedding_column" as the feature function in a case where the number of unique values included in the learning data exceeds the predetermined third threshold value, and selects "Categorical_column_with_hash_bucket" as the feature function in a case where the number of unique values included in the learning data is less than the predetermined third threshold value.

Furthermore, in a case where the learning data is a character string, the information processing apparatus 10 generates the generation index on the basis of the number of types of character strings included in the learning data. For example, the information processing apparatus 10 counts the number of unique character strings (the number of unique data) included in the learning data, and in a case where the counted number is less than a predetermined fourth threshold value, selects "categorical_column_with_vocabulary_list" or/and "categorical_column_with_vocabulary_file" as the feature function. Furthermore, in a case where the counted number is less than a fifth threshold value larger than the predetermined fourth threshold value, the information processing apparatus 10 selects "categorical_column_with_vocabulary_file & embedding_column" as the feature function. Furthermore, in a case where the counted number exceeds the fifth threshold value larger than the predetermined fourth threshold value, the information processing apparatus 10 selects "categorical_column_with-_hash_bucket & embedding_column" as the feature function.

Furthermore, in a case where the learning data is a floating point, the information processing apparatus 10 generates a conversion index into input data for inputting the learning data to the model as a generation index of the model. For example, the information processing apparatus 10 selects "bucketized_column" or "numeric_colum" as the feature function. That is, the information processing apparatus 10 bucketizes (groups) the learning data and selects whether to input the number of the bucket or directly input the numerical value. Note that, for example, the information processing apparatus 10 may perform bucketization of the learning data such that the ranges of numerical values associated with the respective buckets are substantially the same, and for example, may associate the ranges of numerical values with the respective buckets such that the number of pieces of learning data classified into the respective buckets is substantially the same. Furthermore, the information processing apparatus 10 may select the number of buckets or a range of numerical values associated with the buckets as the generation index.

Furthermore, the information processing apparatus 10 acquires learning data indicating a plurality of features, and generates, as a model generation index, a generation index indicating a feature to be learned by the model among the features included in the learning data. For example, the information processing apparatus 10 determines which label of learning data is input to the model, and generates a generation index indicating the determined label. Furthermore, the information processing apparatus 10 generates, as a generation index of the model, a generation index indicating a plurality of types for which correlation is learned with respect to the model among types of learning data. For example, the information processing apparatus 10 determines a combination of labels to be simultaneously input to the model, and generates a generation index indicating the determined combination.

Furthermore, the information processing apparatus 10 generates a generation index indicating the number of dimensions of learning data input to the model as a generation index of the model. For example, the information processing apparatus 10 may determine the number of nodes in the input layer of the model according to the number of unique data included in the learning data, the number of labels input to the model, a combination of the number of labels input to the model, the number of buckets, and the like.

Furthermore, the information processing apparatus 10 generates a generation index indicating the type of the model for which the feature of the learning data is learned, as the generation index of the model. For example, the information processing apparatus 10 determines the type of the model to be generated according to the density and sparsity of the learning data to be learned in the past, the content of the label, the number of labels, the number of combinations of labels, and the like, and generates the generation index indicating the determined type. For example, the information processing apparatus 10 generates a generation index indicating "BaselineClassifier", "LinearClassifier", "DNN-Classifier", "DNNLinearCombinedClassifier", "BoostedTreesClassifier", "AdaNetClassifier", "RNNClassifier", "DNNResNetClassifier", "AutoIntClassifier", or the like as a model class in AutoML.

Note that the information processing apparatus 10 may generate a generation index indicating various independent variables of the model of the respective classes. For example, the information processing apparatus 10 may generate a generation index indicating the number of intermediate layers included in the model or the number of nodes included in each layer as the generation index of the model. Furthermore, the information processing apparatus 10 may generate a generation index indicating a connection mode between nodes included in the model and a generation index indicating a size of the model as the generation index of the model. These independent variables are appropriately selected according to whether or not various statistical features included in the learning data satisfy a predetermined condition.

Furthermore, the information processing apparatus 10 may generate, as the generation index of the model, a learning mode when the feature of the learning data is learned by the model, that is, a generation index indicating a hyperparameter. For example, the information processing apparatus 10 may generate a generation index indicating "stop_if_no_decrease_hook", "stop_if_no_increase_hook", "stop_if_higher_hook", or "stop_if_lower_hook" in the setting of the learning mode in AutoML.

That is, the information processing apparatus 10 generates the generation index indicating the feature of the learning data to be learned by the model, the mode of the model to be generated, and the learning mode when the feature of the learning data is learned by the model on the basis of the label of the learning data used for learning and the feature of the data itself. More specifically, the information processing apparatus 10 generates a configuration file for controlling generation of a model in AutoML.

3-3. Order of Determining Generation Index

Here, the information processing apparatus 10 may perform the optimization of the various indexes described above simultaneously in parallel, or may perform the optimization in an appropriate order. Furthermore, the information processing apparatus 10 may change the order of optimizing each index. That is, the information processing apparatus 10 may receive, from the user, designation of the feature of the learning data to be learned by the model, the mode of the model to be generated, and the order of determining the learning mode when the feature included in the learning data is learned by the model, and determine each index in the order of reception.

For example, in a case where the generation of the generation index is started, the information processing apparatus 10 optimizes the input feature such as the feature of the learning data to be input and the mode of inputting the learning data, and then optimizes the input cross feature such as which features of a combination of features is to be learned. Subsequently, the information processing apparatus 10 selects a model and optimizes a model structure. Thereafter, the information processing apparatus 10 optimizes the hyperparameter and ends the generation of the generation index.

Here, in the input feature optimization, the information processing apparatus 10 may repeatedly optimize the input feature by selecting and correcting various input features such as a feature and an input mode of learning data to be input and selecting a new input feature using a genetic algorithm. Similarly, in the input cross feature optimization, the information processing apparatus 10 may repeatedly optimize the input cross feature, and may repeatedly execute model selection and model structure optimization. Furthermore, the information processing apparatus 10 may repeatedly execute hyperparameter optimization. Furthermore, the information processing apparatus 10 may repeatedly execute a series of processes of input feature optimization, input cross feature optimization, model selection, model structure optimization, and hyperparameter optimization to optimize each index.

Furthermore, for example, the information processing apparatus 10 may perform model selection and model structure optimization after performing hyperparameter optimization, and may perform input feature optimization and input cross feature optimization after model selection and model structure optimization. Furthermore, for example, the information processing apparatus 10 repeatedly executes input feature optimization, and then repeatedly executes input cross feature optimization. Thereafter, the information processing apparatus 10 may repeatedly execute the input feature optimization and the input cross feature optimization. In this manner, arbitrary setting can be adopted as to which index is optimized in which order and which optimization processing is repeatedly executed in the optimization.

Figure 2:
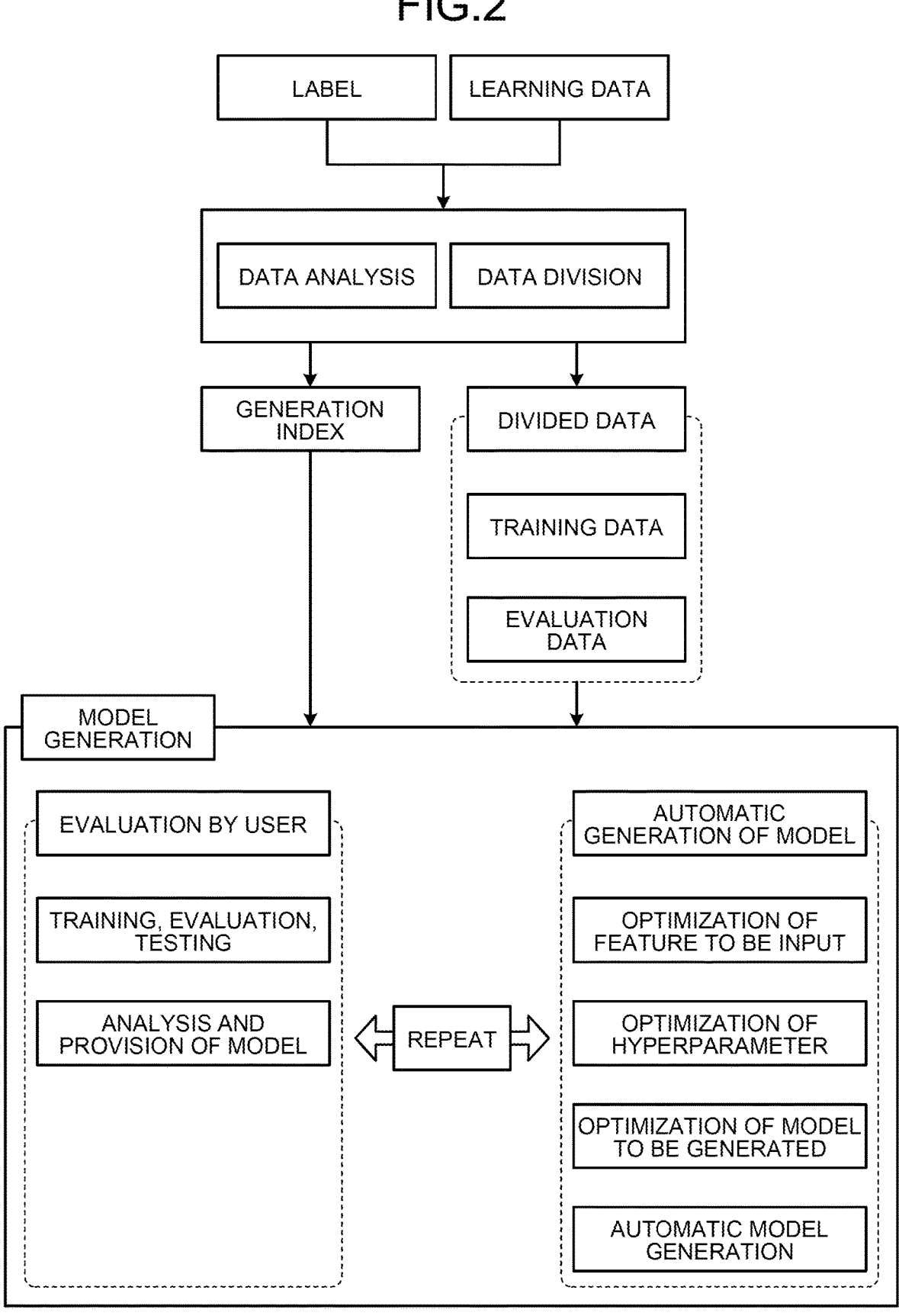
FIG. 2 is a diagram illustrating an example of a flow of model generation using an information processing apparatus according to the embodiment.

3-4. Flow of Model Generation Implemented by Information Processing Apparatus Next, an example of a flow of model generation using the information processing apparatus 10 will be described with reference to FIG. 2. FIG. 2 is a diagram illustrating an example of a flow of model generation using the information processing apparatus according to the embodiment. For example, the information processing apparatus 10 receives learning data and a label of each piece of learning data. Note that the information processing apparatus 10 may receive a label together with designation of learning data.

In such a case, the information processing apparatus 10 analyzes the data and divides the data according to the analysis result. For example, the information processing apparatus 10 divides the learning data into training data used for model learning and evaluation data used for model evaluation (that is, measurement of accuracy). Note that the information processing apparatus 10 may further divide data for various tests. Note that, as the processing of dividing such learning data into training data and evaluation data, various arbitrary known techniques can be employed.

Furthermore, the information processing apparatus 10 generates the above-described various generation indexes using the learning data. For example, the information processing apparatus 10 generates a configuration file that defines a model generated in AutoML and learning of the model. In such a configuration file, various functions used in AutoML are directly stored as information indicating the generation index. Then, the information processing apparatus 10 generates the model by providing the training data and the generation index to the model generation server 2.

Here, the information processing apparatus 10 may achieve the optimization of the generation index and eventually the optimization of the model by repeatedly performing the evaluation of the model by the user and the automatic generation of the model. For example, the information processing apparatus 10 optimizes a feature to be input (optimizes an input feature and an input cross feature), optimizes a hyperparameter, and optimizes a model to be generated, and automatically generates a model according to the optimized generation index. Then, the information processing apparatus 10 provides the generated model to the user.

Meanwhile, the user trains, evaluates, and tests the automatically generated model, and analyzes and provides the model. Then, the user corrects the generated generation index to automatically generate a new model again, and performs evaluation, test, and the like. By repeatedly executing such processing, it is possible to implement processing for improving the accuracy of the model while performing trial and error without executing complicated processing.

4. Configuration of Information Processing Apparatus

Figure 3:
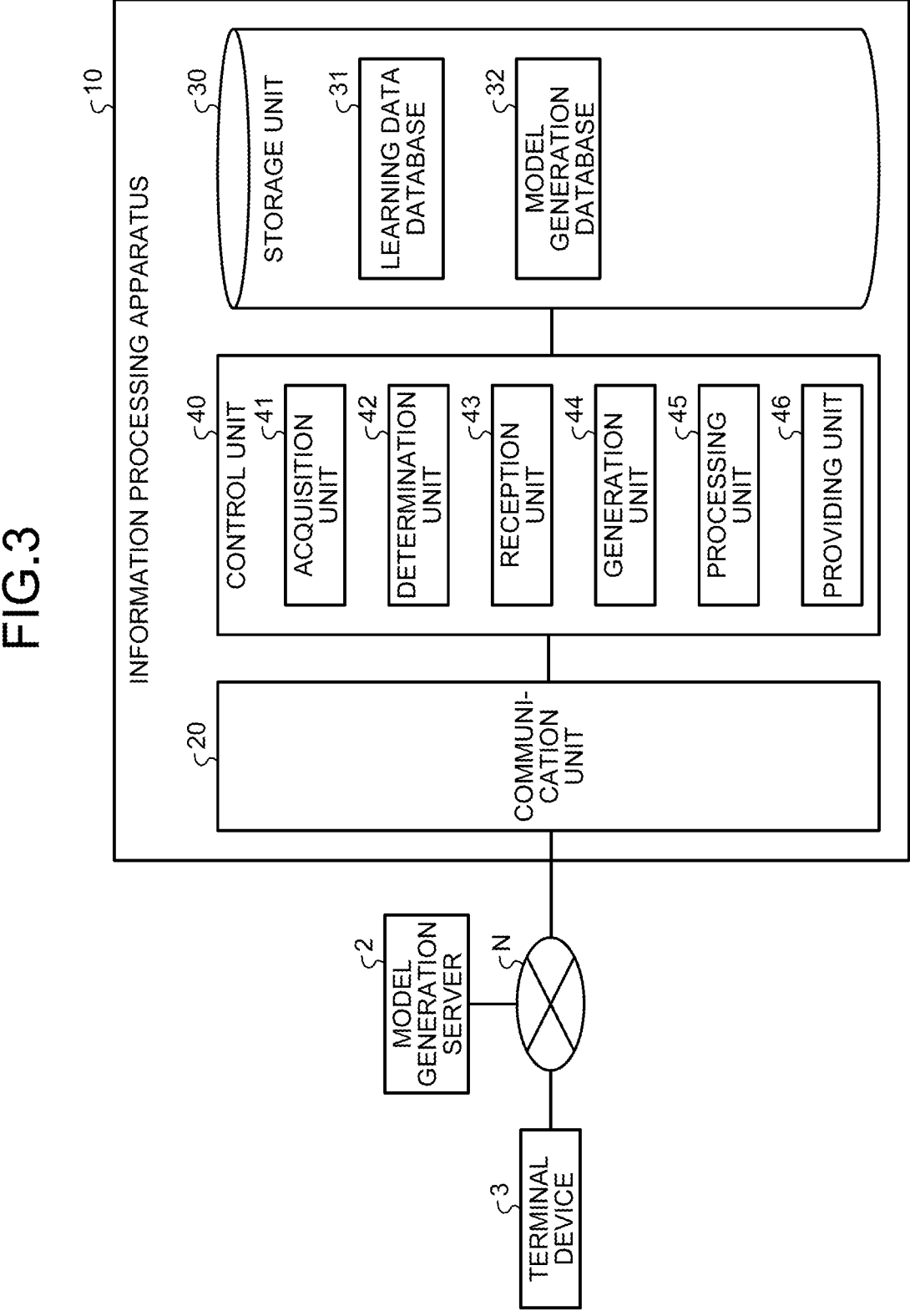
FIG. 3 is a diagram illustrating a configuration example of the information processing apparatus according to the embodiment.

Next, an example of a functional configuration of the information processing apparatus 10 according to the embodiment will be described with reference to FIG. 3. FIG. 3 is a diagram illustrating a configuration example of the information processing apparatus according to the embodiment. As illustrated in FIG. 3, the information processing apparatus 10 includes a communication unit 20, a storage unit 30, and a control unit 40.

The communication unit 20 is implemented by, for example, a network interface card (NIC) or the like. The communication unit 20 is connected to the network N in a wired or wireless manner, and transmits and receives information to and from the model generation server 2 and the terminal device 3.

The storage unit 30 is implemented by, for example, a semiconductor memory element such as a random access memory (RAM) or a flash memory, or a storage device such as a hard disk or an optical disk. In addition, the storage unit 30 includes a learning data database 31 and a model generation database 32.

The learning data database 31 stores various types of information regarding data used for learning. The learning data database 31 stores a data set of learning data used for model learning. FIG. 4 is a diagram illustrating an example of information registered in the learning database according to the embodiment. In the example of FIG. 4, the learning data database 31 includes items such as "data set ID", "data ID", and "data".

"Data set ID" indicates identification information for identifying the data set. "Data ID" indicates identification information for identifying each piece of data. "Data" indicates data identified by the data ID. For example, in the example of FIG. 4, corresponding data (learning data) is registered in association with a data ID for identifying each piece of learning data.

The example of FIG. 4 illustrates that the data set (data set DS1) identified by the data set ID "DS1" includes a plurality of pieces of data "DT1", "DT2", "DT3", and the like identified by the data IDs "DID1", "DID2", "DID3", and the like. Note that, in FIG. 4, data is indicated by an abstract character string such as "DT1", "DT2", or "DT3", but information in an arbitrary format such as various integers, floating points, or character strings is registered as the data.

Note that, although not illustrated, the learning data database 31 may store a label (correct answer information) corresponding to each data in association with each data. In addition, for example, one label may be stored in association with a data group including a plurality of pieces of data. In this case, a data group including a plurality of pieces of data corresponds to data (input data) input to the model. For example, information in an arbitrary format such as a numerical value or a character string is used as the label.

Note that the learning data database 31 is not limited to the above, and may store various types of information according to a purpose. For example, the learning data database 31 may store whether each data is data (training data) used for learning processing, data (evaluation data) used for evaluation, and the like in a specifiable manner. For example, the learning data database 31 may store information (flag or the like) specifying whether each data is training data or evaluation data in association with each data.

The model generation database 32 stores various types of information used for model generation other than learning data. The model generation database 32 stores various types of information regarding the model to be generated. For example, the model generation database 32 stores information used for generating a model on the basis of a genetic algorithm. For example, the model generation database 32 stores information designating the number of combinations of types inherited in subsequent processing on the basis of the genetic algorithm.

For example, the model generation database 32 stores setting values such as various parameters related to the model to be generated. The model generation database 32 stores an upper limit value (also referred to as "size upper limit value") of the size of the model. The model generation database 32 stores information indicating the structure of the model, such as the number of blocks (partial models) included in the model to be generated and information regarding each block. The model generation database 32 stores information related to a module used as a component of a block.

The model generation database 32 stores information indicating what kind of processing each module performs, information regarding elements constituting each module, and the like. The model generation database 32 stores various types of information regarding processing constituting each module. The model generation database 32 stores information on processing of configuring each module such as normalization and dropout. For example, the model generation database 32 stores information regarding various modules used as block components, such as modules MO1 to MO7 illustrated in FIG. 10.

For example, the model generation database 32 stores information on each block. The model generation database 32 stores information indicating what kind of module each block is configured by. For example, the model generation database 32 stores information indicating the number of modules included in each block. The model generation database 32 stores information indicating modules included in each block.

The model generation database 32 stores information indicating the type of data used as an input by each block. For example, the model generation database 32 stores information indicating a combination of types of data used as an input by each block. As illustrated in FIG. 11, the model generation database 32 stores information indicating a combination of types of data used as an input by each block and a format using data of each type.

The model generation database 32 is not limited to the above, and may store various pieces of model information as long as the information is used to generate the model.

Returning to FIG. 3, the description will be continued. The control unit 40 is implemented by, for example, a central processing unit (CPU), a micro processing unit (MPU), or the like executing various programs (for example, a generation program that executes a process of generating a model, an information processing program, and the like) stored in a storage device inside the information processing apparatus 10 using a RAM as a work area. The information processing program is used to operate the computer as a model having at least one block. For example, the information processing program causes a computer (for example, the information processing apparatus 10) to operate as a model on which learning has been performed using learning data. Furthermore, the control unit 40 is implemented by, for example, an integrated circuit such as an application specific integrated circuit (ASIC) or a field programmable gate array (FPGA). As illustrated in FIG. 3, the control unit 40 includes an acquisition unit 41, a determination unit 42, a reception unit 43, a generation unit 44, a processing unit 45, and a providing unit 46.

The acquisition unit 41 acquires information from the storage unit 30. The acquisition unit 41 acquires a data set of learning data used for model learning. The acquisition unit 41 acquires learning data used for model learning. For example, when receiving various data to be used as learning data and labels given to the various data from the terminal device 3, the acquisition unit 41 registers the received data and labels in the learning data database 31 as learning data. Note that the acquisition unit 41 may receive designation of a learning data ID or a label of learning data used for model learning among data registered in the learning data database 31 in advance.

The acquisition unit 41 acquires learning data used for learning of a model having a plurality of blocks including a first block to which an output from a first input layer is input and a second block to which an output from a second input layer different from the first input layer is input, in which the learning data includes a plurality of types of information. The acquisition unit 41 acquires learning data including a plurality of types of information that are attributes to which the information included in the learning data corresponds. The acquisition unit 41 acquires learning data including a plurality of types of information including a category to which the learning data belongs. The acquisition unit 41 acquires learning data including a plurality of types of information including a type related to a transaction target.

The acquisition unit 41 acquires learning data including a plurality of types of information including a type related to a transaction target provider.

The acquisition unit 41 acquires learning data used for learning of a model having a plurality of blocks each including at least one module. The acquisition unit 41 acquires learning data used for learning of a model having at least one block to which an output from the input layer is input, in which the learning data includes a plurality of types of information. The acquisition unit 41 acquires input data including a plurality of types of information used as inputs to a model having at least one block to which an output from the input layer is input.

The determination unit 42 determines various types of information regarding the learning processing. The determination unit 42 determines a learning mode. The determination unit 42 determines an initial value and the like in the learning processing by the generation unit 44. The determination unit 42 determines an initial value of each parameter. The determination unit 42 refers to a setting file indicating an initial setting value of each parameter and determines an initial value of each parameter. The determination unit 42 determines the maximum number of blocks to be included in the model. The determination unit 42 determines the maximum number of modules to be included in the block. The determination unit 42 determines the dropout rate. The determination unit 42 determines the dropout rate of each block. The determination unit 42 determines the size of the model. The determination unit 42 determines the number of modules included in each block.

The reception unit 43 receives correction of the generation index presented to the user. In addition, the reception unit 43 receives, from the user, designation of a feature of learning data to be learned by the model, a mode of the model to be generated, and an order of determining a learning mode when the feature of the learning data is learned by the model.

The generation unit 44 generates various types of information according to the determination by the determination unit 42. In addition, the generation unit 44 generates various types of information according to the instruction received by the reception unit 43. For example, the generation unit 44 may generate a model generation index.

The generation unit 44 selects a type included in data input to each of the plurality of blocks in learning using learning data, and generates a model by using first data in which a combination of the selected types among the plurality of types is a first combination as an input from the first input layer to the first block and second data in which a combination of the selected types is a second combination as an input from the second input layer to the second block. The generation unit 44 generates a model in which a combination of types included in first data input from the first input layer to the first block is a first combination and a combination of types included in second data input from the second input layer to the second block is a second combination among the plurality of types by selecting a type included in data input to each of the plurality of blocks in learning using learning data. The generation unit 44 generates a model in which the first combination of the types included in the first data input from the first input layer to the first block and the second combination of the types included in the second data input from the second input layer to the second block are different.

The generation unit 44 generates a model in which the first data of the first combination is input to the first block and the second data of the second combination is input to the second block by processing for optimizing the combination of types included in the data input to each of the plurality of blocks. The generation unit 44 generates a model in which the first data of the first combination is input to the first block and the second data of the second combination is input to the second block by processing based on the genetic algorithm.

The generation unit 44 generates a model in which the number of modules included in the first block is a first number and the number of modules included in the second block is a second number. The generation unit 44 generates a model having a first block including a first number of modules and a second block including a second number of modules different from the first number.

The generation unit 44 generates a model in which an input to one module is connected as an input to another module by learning using learning data. The generation unit 44 generates a model having a plurality of blocks including a first block including at least one module and a second block including at least one module. The generation unit 44 generates a model in which an input to one module included in the first block is connected as an input to another module included in the second block.

The generation unit 44 generates a model in which an input to one module of the first layer in the first block is connected as an input to another module of the second layer in the second block. The generation unit 44 generates a model in which an input to one module is connected as an input to another module of the second layer larger than the first layer. The generation unit 44 generates a model having a plurality of blocks including a first block to which an output from the first input layer is input and a second block to which an output from a second input layer different from the first input layer is input.

The generation unit 44 generates a model having a plurality of blocks including a first block including a plurality of modules. The generation unit 44 generates a model in which an input to one module included in the first block is connected as an input to another module included in the first block. The generation unit 44 generates a model in which an input to one module of the first layer in the first block is connected as an input to another module of the second layer in the first block. The generation unit 44 generates a model in which an input to one module is connected as an input to another module of the second layer larger than the first layer.

In learning using learning data, the generation unit 44 selects a type included in data input to a block by processing based on a genetic algorithm, and generates a model by using data corresponding to a combination of the selected types among a plurality of types as an input from the input layer to the block. In learning using learning data, the generation unit 44 selects a type included in data input to a block by processing based on a genetic algorithm, thereby generating a model in which a combination of types included in data input from an input layer to the block is determined among a plurality of types. At the time of inference using the model, the generation unit 44 determines a combination of types in which a part is used as an input to the block. Accordingly, since the information processing apparatus 10 can arbitrarily select the type of data used for inference, it is possible to generate a model that can flexibly use input data.

The generation unit 44 determines a type to be masked at the time of inference using the model among a combination of types. The generation unit 44 generates a model in which a combination of types included in data input from the input layer to the block is determined by combination optimization based on a genetic algorithm. The generation unit 44 generates a model in which a combination of types included in data input from the input layer to the block is determined by search based on a genetic algorithm.

The generation unit 44 may generate a model on the basis of a genetic algorithm. For example, the generation unit 44 generates a plurality of models targeting a plurality of combination candidates having different combinations of types. The generation unit 44 may further generate a model by using combination candidates (also referred to as "inheritance candidates") corresponding to a predetermined number (for example, two) of models with high accuracy among the plurality of generated models. For example, the generation unit 44 may inherit some combinations of types from each of the inheritance candidates, and generate the model using the type candidate to which the combination of the types of the inheritance candidates has been copied. The generation unit 44 may generate a model to be finally used by repeating processing of generating a model by taking over the above-described combination of types of inheritance candidates.

The generation unit 44 transmits data used for generating the model to the external model generation server 2 to request the model generation server 2 to learn the model, and receives the model learned by the model generation server 2 from the model generation server 2 to generate the model.

For example, the generation unit 44 generates a model using data registered in the learning data database 31. The generation unit 44 generates a model on the basis of each data used as training data and a label. The generation unit 44 generates a model by performing learning so that an output result output from the model when training data is input matches a label. For example, the generation unit 44 generates a model by causing the model generation server 2 to learn a model by transmitting each data and label used as training data to the model generation server 2.

For example, the generation unit 44 measures the accuracy of the model using the data registered in the learning data database 31. The generation unit 44 measures the accuracy of the model on the basis of each data used as the evaluation data and the label. The generation unit 44 measures the accuracy of the model by collecting a result of comparing the label with the output result output from the model when the evaluation data is input.

The processing unit 45 performs various processes. The processing unit 45 functions as an inference unit that performs inference processing. The processing unit 45 performs inference processing using the model (for example, the model M1) stored in the storage unit 30. The processing unit 45 performs inference using the model acquired by the acquisition unit 41. The processing unit 45 performs inference using the model generated by the generation unit 44. The processing unit 45 performs inference using a model learned using the model generation server 2. The processing unit 45 performs inference processing of generating an inference result corresponding to data by inputting the data to the model.

The processing unit 45 executes inference processing using the model generated by the generation unit 44. The processing unit 45 executes the inference processing on the basis of output data output by the model by using input data corresponding to the combination of types determined as an input to the block of the model. The processing unit 45 executes the inference processing on the basis of output data output by the model by using data corresponding to only a part of the combination of types determined as an input to the model block.

The processing unit 45 executes the inference processing on the basis of output data output by the model by using, as an input to the block of the model, data in which a masking type that is a type to be partially masked among the combination of types determined is masked. The processing unit 45 executes inference processing on the basis of output data output by the model by using data in which a masking type determined on the basis of a predetermined criterion is masked as an input to a block of the model.

The processing unit 45 executes the inference processing on the basis of the output data output by the model by using the data in which the masking type determined according to the purpose of the inference processing is masked as an input to the block of the model. The processing unit 45 executes the inference processing on the basis of the output data output by the model by using the data in which the masking type determined according to the user who is the target of the inference processing is masked as an input to the block of the model. The processing unit 45 executes inference processing on the basis of output data output by the model by using data in which a masking type that is a type to be partially masked among a combination of types is masked as an input to a block of the model.

The processing unit 45 may execute the inference processing using an external device (inference server) having a model. For example, the processing unit 45 may transmit input data to an inference server having a model, receive information (inference information) generated by using the input data received by an external device and the model, and perform inference processing by using the received inference information.

The providing unit 46 provides the generated model to the user. The providing unit 46 transmits an information processing program for operating the terminal device 3 of the user as a model (for example, the model M1) used for the inference processing to the terminal device 3 of the user. For example, in a case where the accuracy of the model generated by the generation unit 44 exceeds a predetermined threshold value, the providing unit 46 transmits the model and the generation index corresponding to the model to the terminal device 3. As a result, the user can evaluate and try the model and correct the generation index.

The providing unit 46 presents the index generated by the generation unit 44 to the user. For example, the providing unit 46 transmits a configuration file of AutoML generated as a generation index to the terminal device 3. Furthermore, the providing unit 46 may present the generation index to the user every time the generation index is generated, and for example, may present only the generation index corresponding to the model whose accuracy exceeds a predetermined threshold value to the user.

5. Processing Flow of Information Processing System

Next, a procedure of processing executed by the information processing apparatus 10 will be described with reference to FIGS. 5 to 8. FIGS. 5 to 8 are flowcharts illustrating an example of a flow of information processing according to the embodiment. Furthermore, in the following, a case where the information processing system 1 performs processing will be described as an example, but the following processing may be performed by any device included in the information processing system 1, such as the information processing apparatus 10, the model generation server 2, and the terminal device 3 included in the information processing system 1.

5-1. Exemplary Generation Processing Flow

First, a flow of information processing regarding model generation processing will be described with reference to FIGS. 5 to 7. An outline of a flow of processing of generating models of different types included in data input for each block in the information processing system 1 will be described with reference to FIG. 5.

In FIG. 5, the information processing system 1 acquires learning data used for learning of a model having a plurality of blocks including a first block to which an output from a first input layer is input and a second block to which an output from a second input layer different from the first input layer is input, in which the learning data includes a plurality of types of information (Step S101).

Then, the information processing system 1 selects a type included in data input to each of the plurality of blocks in learning using the learning data, and generates a model by using first data in which a combination of the selected types is a first combination as an input from the first input layer to the first block and second data in which a combination of the selected types is a second combination as an input from the second input layer to the second block (Step S102). For example, the information processing system 1 generates a model in which a combination of types included in first data input from the first input layer to the first block is a first combination and a combination of types included in second data input from the second input layer to the second block is a second combination among the plurality of types by selecting a type included in data input to each of the plurality of blocks in learning using learning data Next, an outline of a flow of processing of generating a model using an input to one module as an input to another module in the information processing system 1 will be described with reference to FIG. 6.

In FIG. 6, the information processing system 1 acquires learning data used for learning of a model having a plurality of blocks each including at least one module (Step S201).

Then, the information processing system 1 generates a model in which an input to one module is connected as an input to another module by learning using the learning data (Step S202). For example, the information processing system 1 generates a model in which an input to one module of the first block is connected as an input to another module of the second block.

Next, an outline of a flow of processing for generating a model by processing based on a genetic algorithm in the information processing system 1 will be described with reference to FIG. 7.

In FIG. 7, the information processing system 1 acquires learning data used for learning of a model having at least one block to which an output from the input layer is input, in which the learning data includes a plurality of types of information (Step S301).

Then, in learning using learning data, the information processing system 1 selects a type included in data input to a block by processing based on a genetic algorithm, and generates a model by using data corresponding to a combination of the selected types among a plurality of types as an input from the input layer to the block (Step S302). For example, in learning using learning data, the information processing system 1 selects a type included in data input to a block by processing based on a genetic algorithm, thereby generating a model in which a combination of types included in data input from an input layer to the block is determined among a plurality of types.

5-2. Exemplary Inference Processing Flow

Next, a flow of information processing regarding inference processing using a model will be described with reference to FIG. 8. An outline of a flow of processing of performing inference using a model in the information processing system 1 will be described with reference to FIG. 8. For example, the information processing system 1 executes inference processing by masking a part of the input to the model.

In FIG. 8, the information processing system 1 acquires input data including a plurality of types of information used as inputs to a model having at least one block to which an output from an input layer is input (Step S401).

Then, the information processing system 1 executes inference processing on the basis of output data output by the model by using data in which a masking type that is a type to be partially masked among a combination of types is masked as an input to a block of the model (Step S402). For example, the information processing system 1 executes inference processing on the basis of output data output by the model by masking data corresponding to some types among input data to the model and inputting the data to the model.

6. Processing Example of Information Processing System

Here, an example in which the information processing system 1 performs the processing of FIGS. 5 to 8 described above will be described. The information processing apparatus 10 acquires learning data. The information processing apparatus 10 acquires information such as parameters used for generating a model. For example, the information processing apparatus 10 acquires information indicating various upper limit values for the model to be generated. For example, the information processing apparatus 10 acquires information indicating the size upper limit value of the model to be generated. Furthermore, the information processing apparatus 10 acquires various setting values in the genetic algorithm. For example, the information processing apparatus 10 acquires information indicating the number of inheritance candidates in the genetic algorithm.

The information processing apparatus 10 generates a model on the basis of learning data, information indicating a structure of the model, various upper limit values such as a size upper limit value, and information indicating a setting value in a genetic algorithm. The information processing apparatus 10 generates a model having a plurality of blocks to which an output from each input layer is input. The information processing apparatus 10 generates a model having a plurality of blocks each including at least one module. The information processing apparatus 10 selects a type included in data input to a block by processing based on a genetic algorithm, thereby generating a model in which a combination of types included in data input from an input layer to the block is determined among a plurality of types.

For example, the information processing apparatus 10 generates a model having a plurality of blocks including one block (first block) to which an output from one input layer (first input layer) is input and another block (second block) to which an output from another input layer (second input layer) different from the first input layer is input. Specifically, the information processing apparatus 10 generates a model in which data (first data) of one combination (first combination) among a plurality of types included in data is input from one input layer to the first block, and data (second data) of another combination (second combination) is input from the second input layer to the second block.

For example, the information processing apparatus 10 generates a model in which an input to one module is connected as an input to another module. Specifically, the information processing apparatus 10 generates a model in which an input to one module included in the first block is connected as an input to another module included in the second block.

The information processing apparatus 10 transmits information used for generating a model to the model generation server 2 that learns the model. For example, the information processing apparatus 10 transmits learning data, information indicating the structure of the model, various upper limit values such as a size upper limit value, and information indicating a setting value in the genetic algorithm to the model generation server 2.

The model generation server 2 that has received the information from the information processing apparatus 10 generates a model by learning processing. Then, the model generation server 2 transmits the generated model to the information processing apparatus 10. As described above, "generating a model" in the present application is not limited to a case where the own device learns a model, and is a concept including generating and instructing a model to another device by providing information necessary for generating a model to the other device and receiving a model learned by the other device. In the information processing system 1, the information processing apparatus 10 generates a model by transmitting information used for generating a model to the model generation server 2 that learns the model and acquiring the model generated by the model generation server 2. In this manner, the information processing apparatus 10 requests the generation of the model by transmitting the information used for generating the model to another device, and generates the model by causing the other device that has received the request to generate the model.

7. Model

From here, the model will be described. Hereinafter, each point regarding the model such as the structure and learning mode of the model generated in the information processing system 1 will be described.

7-1. Structure Example of Model

Figure 9:
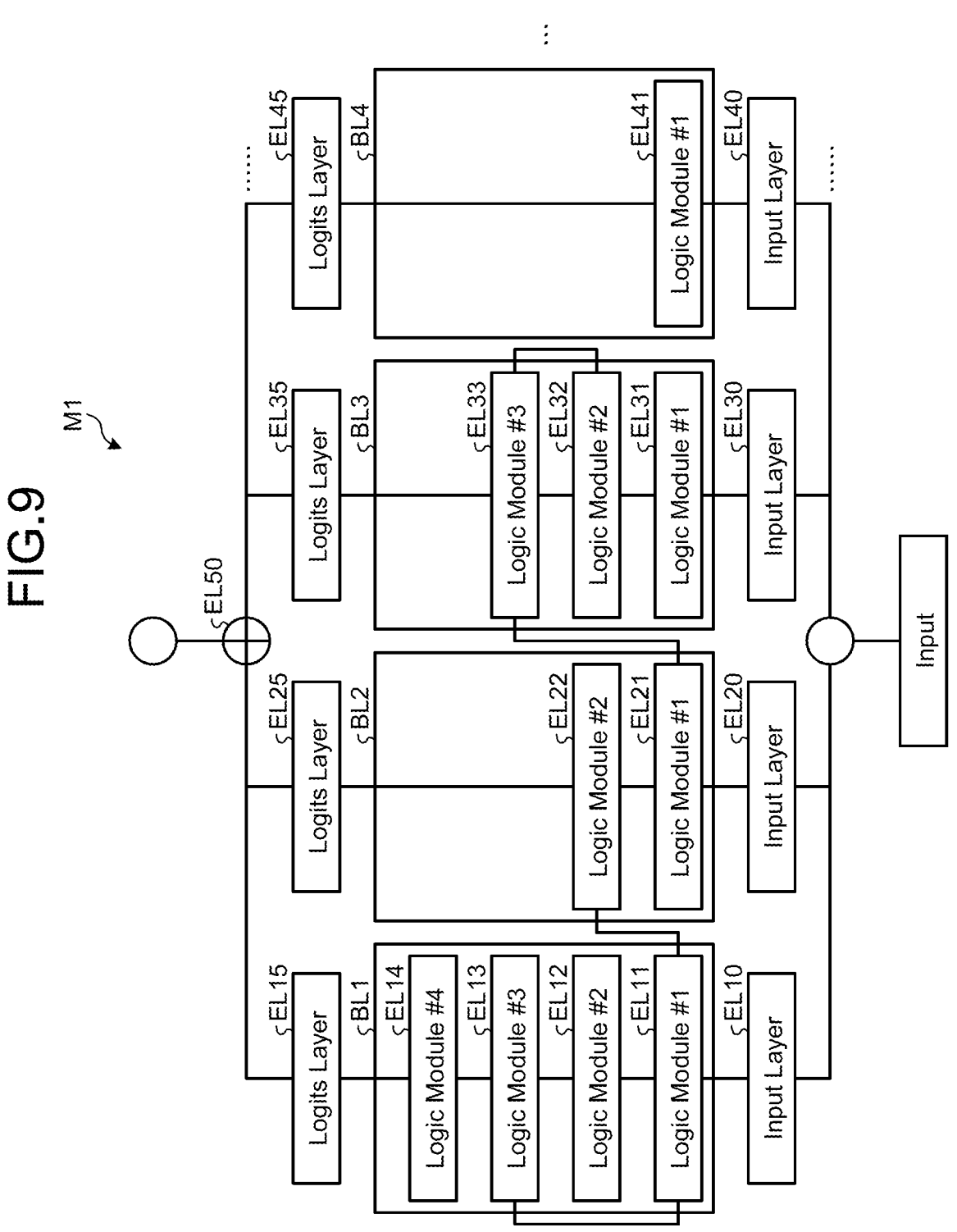
FIG. 9 is a diagram illustrating an example of a structure of a model according to the embodiment.

First, an example of a structure of a model to be generated will be described with reference to FIG. 9. The information processing system 1 generates a model M1 as illustrated in FIG. 9. FIG. 9 is a diagram illustrating an example of a structure of a model according to the embodiment. In FIG. 9, the information processing system 1 generates a model M1 having various configurations such as a plurality of blocks such as blocks BL1, BL2, BL3, and BL4. When the blocks BL1, BL2, BL3, BL4, and the like are described without being particularly distinguished, they may be referred to as "block BL" or simply as "block". Although FIG. 9 illustrates a case where the model M1 has four blocks BL as an example, the model M1 may have five or more blocks BL or three or less blocks BL.

In FIG. 9, the input layers EL10, EL20, EL30, EL40, and the like denoted as "Input Layer" indicate layers to which input data is input. The input layer EL10 is an input layer whose output is input to the block BL1. The input layer EL20 is an input layer whose output is input to the block BL2. The input layer EL30 is an input layer whose output is input to the block BL3. The input layer EL40 is an input layer whose output is input to the block BL4.

Information (input data) indicated as "Input" in FIG. 9 is input to each of the input layers EL10, EL20, EL30, EL40, and the like. In FIG. 9, different types of combination data corresponding to the respective blocks are input to the respective input layers such as the input layers EL10, EL20, EL30, and EL40, but this point will be described later.

The block BL1 is disposed after the input layer EL10, the block BL2 is disposed after the input layer EL20, the block BL3 is disposed after the input layer EL30, and the block BL4 is disposed after the input layer EL40. As illustrated in FIG. 9, one block BL is connected to one input layer. As described above, the model M1 has the number of input layers corresponding to the number of blocks. For example, the model M1 has four input layers EL10, EL20, EL30, and EL40 corresponding to the number of blocks BL1, BL2, BL3, and BL4.

The block BL1 includes four module layers (modules) in FIG. 9. The block BL1 includes a module layer EL11 denoted as "Logic Module #1", a module layer EL12 denoted as "Logic Module #2", a module layer EL13 denoted as "Logic Module #3", and a module layer EL14 denoted as "Logic Module #4". In the block BL1, the module layer EL12 is disposed after the module layer EL11, the module layer EL13 is disposed after the module layer EL12, and the module layer EL14 is disposed after the module layer EL13. That is, the output of the input layer EL10 is input to the module layer EL11, the output of the module layer EL11 is input to the module layer EL12, the output of the module layer EL12 is input to the module layer EL13, and the output of the module layer EL13 is input to the module layer EL14.

Here, in the model M1 of FIG. 9, the module layer EL11 and the module layer EL13 are connected. In the model M1, the input to the module layer EL11 is also used as the input to the module layer EL13. For example, an input to the module layer EL11 which is one module included in the block BL1 is connected as an input to the module layer EL13 which is another module included in the block BL1. In the model M1 of FIG. 9, the input to the module layer EL13 uses the input to the module layer EL11 in addition to the output from the module layer EL12. In this case, the output from the input layer EL10 and the output from the module layer EL12 are input to the module layer EL13. As described above, in FIG. 9, the model M1 is generated in which the input to the module layer EL11 which is the module of the first layer of the block BL1 is connected as the input to the module layer EL13 of the third layer larger than the first layer. As a result, in the block BL1 of the model M1, data that is not affected by the processing of the module layer EL11 can be used as an input of the module layer EL13 at the subsequent stage (subsequent layer) of the module layer EL11.

Figure 10:
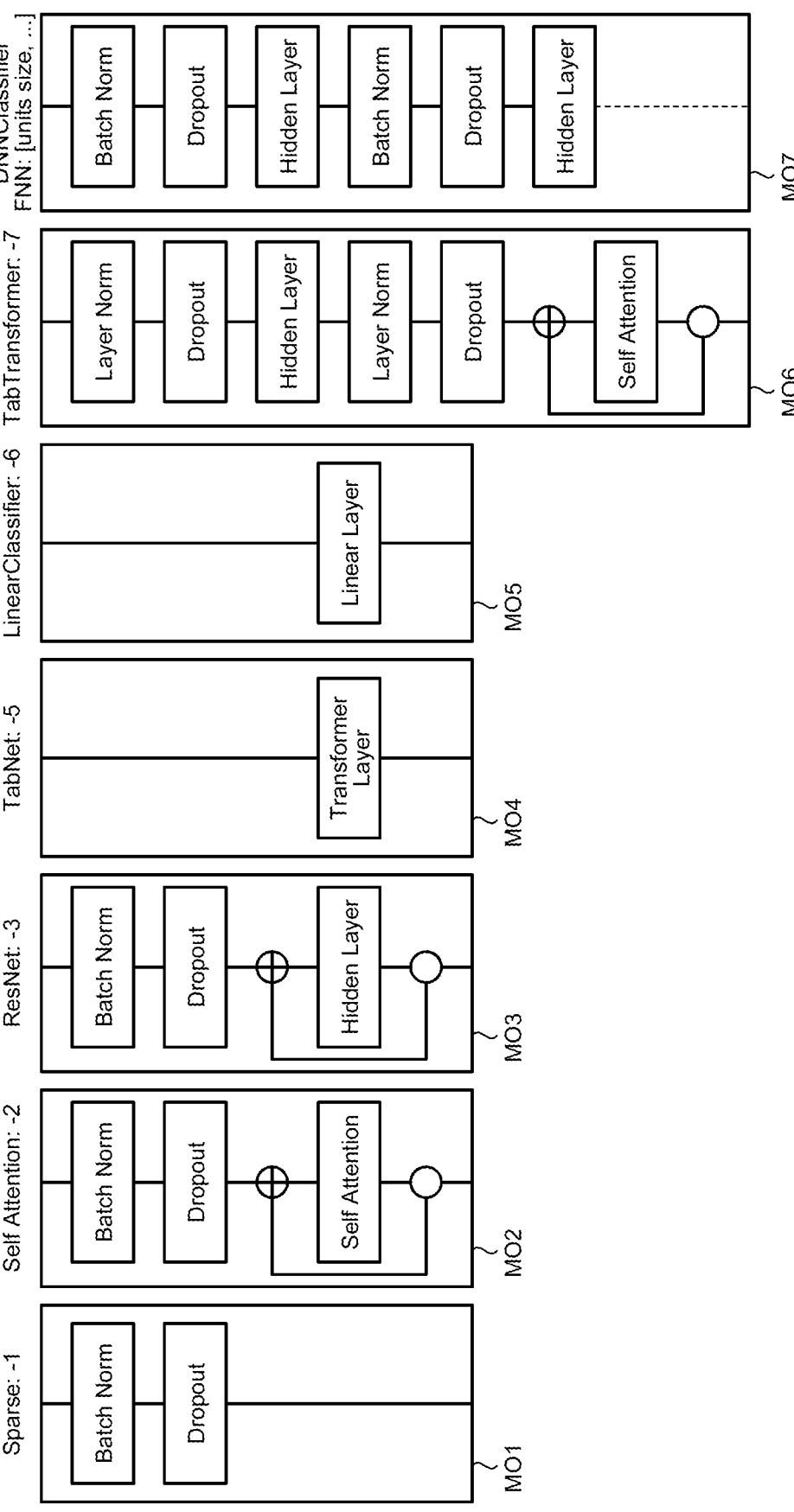
FIG. 10 is a diagram illustrating a module example according to the embodiment.

Note that any module as illustrated in FIG. 10 can be adopted for the module layers EL11, EL12, EL13, EL14, and the like. FIG. 10 is a diagram illustrating a module example according to the embodiment.

FIG. 10 illustrates an example of modules included in the block BL. A module MO1 indicated as "Sparse: −1" in FIG. 10 is a first-type module having functions such as a dropout process indicated as "Dropout" and a batch normalization process indicated as "Batch Norm". Furthermore, the module MO2 indicated as "Self Attention: −2" in FIG. 10 is a second type module having functions such as a self-attention process indicated as "Self Attention" and a batch normalization process. Furthermore, the module MO3 indicated as "ResNet: −3" in FIG. 10 is a third-type module having functions such as a hidden layer indicated as "Hidden Layer" and batch normalization processing. Similarly, the modules MO4 to MO7 are fourth to seventh types of modules having corresponding functions.

Note that the modules MO1 to MO7 illustrated in FIG. 10 are merely examples, and the block BL may include any module. In FIG. 9, for example, the module layer EL11 of the block BL1 may be a module MO1. The module layer EL12 of the block BL1 may be a module MO3. The module layer EL13 of the block BL1 may be a module MO4. The module layer EL14 of the block BL1 may be a module MO7. As described above, the information processing system 1 can generate the model M1 in which arbitrary modules such as the modules MO1 to MO7 are appropriately combined.

In addition, after the block BL1, a logits layer EL15 denoted as "Logits Layer" in FIG. 9 is included. The logits layer EL15 is a layer to which the output from the block BL1 is input, and generates information (value) to be output to the composite layer EL50 on the basis of the output from the block BL1. In FIG. 9, the output of the module layer EL14 of the block BL1 is input to the logits layer EL15. For example, the logits layer EL15 functions as an output layer corresponding to the block BL1.

The block BL2 includes two module layers (modules) in FIG. 9. The block BL2 includes a module layer EL21 denoted as "Logic Module #1" and a module layer EL22 denoted as "Logic Module #2". In the block BL2, the module layer EL22 is disposed after the module layer EL21. That is, the output of the input layer EL20 is input to the module layer EL21, and the output of the module layer EL21 is input to the module layer EL22.

Here, in the model M1 of FIG. 9, the module layer EL11 and the module layer EL22 are connected. That is, in the model M1 of FIG. 9, the input of the block BL1 to the module layer EL11 is also used as the input of the block BL2 to the module layer EL22. As described above, in the model M1 of FIG. 9, the data (information) in the block BL1 which is one block is also used as the data (information) of the block BL2 which is another block.

For example, an input to the module layer EL11 which is one module included in the block BL1 is connected as an input to the module layer EL22 which is another module included in the block BL2 other than the block BL1. In the model M1 of FIG. 9, the input to the module layer EL22 uses the input to the module layer EL11 in addition to the output from the module layer EL21. In this case, the output from the input layer EL10 and the output from the module layer EL21 are input to the module layer EL22. As described above, in FIG. 9, the model M1 is generated in which the input to the module layer EL11 which is the module of the first layer of the block BL1 is connected as the input to the module layer EL22 of the second layer larger than the first layer. As a result, in the model M1, data input to a module of one block can be used as an input to a module of another block.

Note that the above is merely an example, and any configuration can be adopted as long as an input to one module included in the first block is connected as an input to another module included in the second block in the model M1. For example, FIG. 9 illustrates a case where the input to the module layer EL11 is used as the input to the module layer EL22, but the output from the module layer EL11 may be used as the input to the module layer EL22. In this case, an input to the module layer EL12 which is one module included in the block BL1 is connected as an input to the module layer EL22 which is another module included in the block BL2 other than the block BL1. The model M1 is generated in which the input to the module layer EL12 which is the module of the second layer of the block BL1 is connected as the input to the module layer EL22 of the second layer.

Any module as illustrated in FIG. 10 can be adopted for the module layers EL21, EL22, and the like. In FIG. 9, for example, the module layer EL21 of the block BL2 may be a module MO5. The module layer EL22 of the block BL2 may be a module MO2.

In addition, after the block BL2, a logits layer EL25 denoted as "Logits Layer" in FIG. 9 is included. The logits layer EL25 is a layer to which the output from the block BL2 is input, and generates information (value) to be output to the composite layer EL50 on the basis of the output from the block BL2. In FIG. 9, the output of the module layer EL22 of the block BL2 is input to the logits layer EL25. For example, the logits layer EL25 functions as an output layer corresponding to the block BL2.

The block BL3 includes three module layers (modules) in FIG. 9. The block BL3 includes a module layer EL31 denoted as "Logic Module #1", a module layer EL32 denoted as "Logic Module #2", and a module layer EL33 denoted as "Logic Module #3". In the block BL3, the module layer EL32 is disposed after the module layer EL31, and the module layer EL33 is disposed after the module layer EL32. That is, the output of the input layer EL30 is input to the module layer EL31, the output of the module layer EL31 is input to the module layer EL32, and the output of the module layer EL32 is input to the module layer EL33.

Here, in the model M1 of FIG. 9, the module layer EL32 and the module layer EL33 are connected. In the model M1, the input to the module layer EL32 is also used as the input to the module layer EL33. For example, an input to the module layer EL32 which is one module included in the block BL3 is connected as an input to the module layer EL33 which is another module included in the block BL3. In the model M1 of FIG. 9, the input to the module layer EL33 uses the input to the module layer EL32 in addition to the output from the module layer EL32. In this case, the output from the module layer EL31 and the output from the module layer EL32 are input to the module layer EL33. As described above, in FIG. 9, the model M1 is generated in which the input to the module layer EL32 which is the module of the second layer of the block BL3 is connected as the input to the module layer EL33 of the third layer larger than the second layer. As a result, in the block BL3 of the model M1, data that is not affected by the processing of the module layer EL32 can be used as an input of the module layer EL33 at the subsequent stage (subsequent layer) of the module layer EL32.

In addition, in the model M1 of FIG. 9, the module layer EL21 and the module layer EL33 are connected. That is, in the model M1 of FIG. 9, the input of the block BL2 to the module layer EL21 is also used as the input of the block BL3 to the module layer EL33. As described above, in the model M1 of FIG. 9, the data (information) in the block BL2 which is one block is also used as the data (information) of the block BL3 which is another block.

For example, an input to the module layer EL21 which is one module included in the block BL2 is connected as an input to the module layer EL33 which is another module included in the block BL3 other than the block BL2. In the model M1 of FIG. 9, the input to the module layer EL33 uses the input to the module layer EL21 in addition to the output from the module layer EL32. In this case, the output from the input layer EL20 and the output from the module layer EL32 are input to the module layer EL33. As described above, in FIG. 9, the model M1 is generated in which the input to the module layer EL21 which is the module of the first layer of the block BL2 is connected as the input to the module layer EL33 of the third layer larger than the first layer. As a result, in the model M1, data input to a module of one block can be used as an input to a module of another block.

For example, FIG. 9 illustrates a case where the input to the module layer EL21 is used as the input to the module layer EL33, but the output from the module layer EL21 may be used as the input to the module layer EL33. In this case, an input to the module layer EL22 which is one module included in the block BL2 is connected as an input to the module layer EL33 which is another module included in the block BL3 other than the block BL2. The model M1 is generated in which the input to the module layer EL22 which is the module of the second layer of the block BL2 is connected as the input to the module layer EL33 of the third layer larger than the second layer.

Any module as illustrated in FIG. 10 can be adopted for the module layers EL31, EL32, EL33, and the like. In FIG. 9, for example, the module layer EL31 of the block BL3 may be a module MO5. The module layer EL32 of the block BL3 may be a module MO2. The module layer EL33 of the block BL3 may be a module MO2.

In addition, after the block BL3, a logits layer EL35 denoted as "Logits Layer" in FIG. 9 is included. The logits layer EL35 is a layer to which the output from the block BL3 is input, and generates information (value) to be output to the composite layer EL50 on the basis of the output from the block BL3. In FIG. 9, the output of the module layer EL33 of the block BL3 is input to the logits layer EL35. For example, the logits layer EL35 functions as an output layer corresponding to the block BL3.

The block BL4 includes one module layer (module) in FIG. 9. The block BL4 includes a module layer EL41 denoted as "Logic Module #1". That is, the output of the input layer EL40 is input to the module layer EL41.

Any module as illustrated in FIG. 10 can be adopted for the module layer EL41. In FIG. 9, for example, the module layer EL41 of the block BL4 may be a module MO6.

In addition, after the block BL4, a logits layer EL45 denoted as "Logits Layer" in FIG. 9 is included. The logits layer EL45 is a layer to which the output from the block BL4 is input, and generates information (value) to be output to the composite layer EL50 on the basis of the output from the block BL4. In FIG. 9, the output of the module layer EL41 of the block BL4 is input to the logits layer EL45. For example, the logits layer EL45 functions as an output layer corresponding to the block BL4.

Outputs of the logits layers EL15, EL25, EL35, and EL45 are input to the composite layer EL50. The composite layer EL50 may be an output layer of the model M1. The composite layer EL50 is a layer that performs processing of aggregating processing results in each block BL. The composite layer EL50 performs composite processing based on the processing result in each block BL. For example, the composite layer EL50 may be a layer that performs arbitrary processing such as softmax. For example, in the composite layer EL50, the logits layers EL15, EL25, EL35, and EL45 may be directly and fully connected.

The composite layer EL50 generates information to be output on the basis of the output of the logits layers such as the logits layers EL15, EL25, EL35, and EL45. The composite layer EL50 calculates an average of outputs of the logits layers such as the logits layers EL15, EL25, EL35, and EL45 as output information. For example, the composite layer EL50 generates information (composite output) obtained by combining the outputs of the logits layers such as the logits layers EL15, EL25, EL35, and EL45 by calculating an average of each corresponding output in the outputs of the logits layers EL15, EL25, EL35, and EL45. The composite layer EL50 performs softmax processing on the generated composite output. The composite layer EL50 may convert the value of each output so that the sum of the outputs becomes 100% (1). In addition, the composite layer EL50 may calculate the sum of the outputs of the logits layers such as the logits layers EL15, EL25, EL35, and EL45 as the output information.

Note that the above configuration is merely an example, and any configuration can be adopted as the model. In the model M1, any connection can be adopted for the module of the block BL. For example, in the model M1, the input of the module of the block BL1 may be used as the input of the block BL4. For example, the model M1 may be provided with a component that embeds an output from the input layer. For example, the block BL1 may be provided with an embedding layer that vectorizes the output from the input layer EL10. In addition, the block BL2 may be provided with an embedding layer that vectorizes the output from the input layer EL20. In addition, the block BL3 may be provided with an embedding layer that vectorizes the output from the input layer EL30. In addition, the block BL4 may be provided with an embedding layer that vectorizes the output from the input layer EL40.

In addition, embedded data may be input to each module layer in the block BL. For example, in addition to the output from the module layer EL11, data in which the output from the input layer EL10 is embedded may be input to the module layer EL12 of the block BL1. In addition to the output from the module layer EL12, data in which the output from the input layer EL10 is embedded may be input to the module layer EL13 of the block BL1. In this case, the module layers EL11, EL12, and EL13 may be, for example, a module MO3 which is ResNet.

In addition, in the model M1, the logits layers of the plurality of blocks BL may be shared. For example, in the model M1, one logits layer (common logits layer) may be disposed instead of the logits layers EL15, EL25, EL35, EL45, and the like, and a module (common module layer) to which an output from each block BL is input may be disposed at a preceding stage of the common logits layer. In this case, in the model M1, the common module layer to which the output of each of the blocks BL1, BL2, BL3, and BL4 is input is disposed at the subsequent stage of the blocks BL1, BL2, BL3, and BL4, and the common module layer to which the output from the common module layer is input is disposed at the subsequent stage of the common module layer. In this manner, the model M1 may be provided with a common module layer shared by the entire block BL outside the block BL.

As described above, the information processing system 1 learns the model M1 in which the plurality of blocks BL is connected in parallel and the modules of the blocks BL are connected. As a result, the information processing system 1 can generate the model M1 that enables transmission of information between the blocks BL while implementing the function for each block BL.

7-2. Combinations of Inputs

Here, it is possible to input information of any combination of features for each block. For example, it is possible to input data of any combination of types for each block of the model. For example, the type here may be an attribute to which information included in data corresponds. For example, the type may include a type related to an attribute corresponding to a character string included in the data. For example, the type may include a category to which data belongs. For example, in a case where the data is a transaction history (sales history or the like) of a transaction target (product or the like), the type may include a type related to the transaction target. For example, in a case where the data is a transaction history (sales history or the like) of a transaction target (product or the like), the type may include a type related to a provider of the transaction target. For example, when the data is a book sales history, the type may include a type corresponding to an author of the book.

For example, data of any combination of types selected from a plurality of types included in the data may be input to the blocks BL1, BL2, BL3, BL4, and the like of the model M1. The information processing system 1 may determine a combination of types input to each of the blocks BL1, BL2, BL3, and BL4 by processing for optimizing a combination of types included in data input to each of the plurality of blocks BL. The information processing system 1 may determine a combination of types input to each of the blocks BL1, BL2, BL3, and BL4 by processing based on a genetic algorithm.

For example, as illustrated in FIG. 11, the information processing system 1 determines a combination of types corresponding to each block BL. FIG. 11 is a diagram illustrating an example of a combination of inputs according to the embodiment. Each row in FIG. 11 indicates a type of each piece of information included in the data. That is, each row in FIG. 11 indicates a feature included in data. Note that, in FIG. 11, each type is represented in an abstract manner as a type #1, a type #2, or the like, but each type is specific indicating a type (attribute) of the data. For example, the types #1 to #4 may be arbitrary attributes to which the information included in the data corresponds. For example, the type #1 may be a name of a transaction target. Although the types #1 to #4 are illustrated in FIG. 11, the number of types included in the data may be five or more or three or less. For example, when the number of types included in the data is six, the types may include types #5 and #6.

Each row in FIG. 11 corresponds to each of the blocks BL1, BL2, BL3, and BL4. For example, a row in which a block "BL1" is displayed in FIG. 11 indicates a combination of types of data used as an input of the block BL1 of the model M1. That is, the row in which the block "BL1" is displayed in FIG. 11 indicates the feature used as the input of the block BL1 of the model M1.

A type in which "-" is disposed in FIG. 11 indicates that information of the type is not used as an input of a corresponding block. A type in which a number ("format identification information") is disposed in FIG. 11 indicates that information of the type is used as an input of a corresponding block. In addition, the number (format identification information) indicates a format in which the type is used in the block. For example, in a case where the type information is an integer (integrator), the format identification information "0" may indicate that the information is used as a one-hot vector, and the format identification information "1" may indicate that the information is embedded (vectorized) and used. Furthermore, for example, the format identification information may indicate a packetizing method.

In FIG. 11, the block BL1 of the model M1 indicates that the information corresponding to the type #1 and the information corresponding to the type #2 are used as inputs. In the block BL1, the information corresponding to the type #1 indicates that the information is used in the format corresponding to the format identification information "0". In the block BL1, the information corresponding to the type #2 indicates that the information is used in the format corresponding to the format identification information "1". In the block BL1, information corresponding to the type #3 and the type #4 is not used.

7-3. Model Generation Example

An example of model generation will be described below with reference to FIGS. 12 to 14. FIGS. 12 and 13 are diagrams illustrating examples of parameters according to the embodiment. FIG. 14 is a diagram illustrating an example of model generation processing according to the embodiment. For example, as illustrated in FIG. 14, the information processing system 1 may improve the accuracy by increasing the number of blocks one by one while optimizing the combination of features. Note that description of the same points as those described above will be omitted as appropriate.

In this case, the information processing system 1 may generate a model on the basis of an arbitrary setting. For example, the information processing system 1 may update the model by fixing some components related to the model and changing other components by learning. For example, the information processing system 1 may perform optimization while fixing the setting and structure of the feature of the optimized block. For example, the information processing system 1 may fix a combination of types of optimized blocks and a structure of the blocks, and perform optimization of a combination of types of blocks (new blocks) to be newly added, a structure of the new blocks, and a connection between a module of the optimized blocks and a module of the new blocks.

For example, the information processing system 1 may fix the combination of features or the structure of the model on the basis of the settings illustrated in FIGS. 12 and 13. For example, the information processing system 1 may fix a combination of block types or a block structure with reference to a setting file in which settings as illustrated in FIGS. 12 and 13 are described. FIG. 12 illustrates a setting example in a case where a combination of optimized features is fixed. Specifically, FIG. 12 illustrates a setting example in a case where a combination of types of optimized two blocks is fixed. Furthermore, FIG. 13 illustrates a setting example in a case where an optimized hidden block structure is fixed. Specifically, FIG. 13 illustrates a setting example in a case where hidden layers of optimized two blocks are fixed. Note that the settings illustrated in FIGS. 12 and 13 are merely examples, and the information processing system 1 may update the model by fixing some components of the model and performing learning on the basis of an arbitrary setting.

For example, the information processing system 1 may generate a model by fixing only a structure of blocks and relearning parameters. For example, the information processing system 1 may generate the model by fixing only the structure of blocks other than newly added blocks, that is, optimized blocks already added to the model, and relearning only parameters of the optimized blocks.

In a portion corresponding to "number of blocks=1" in FIG. 14, the information processing system 1 indicates a model learned in a state where the number of blocks is one and only the block BL1 is included. The information processing system 1 learns a model having a block BL1 including module layers EL11 to EL14. In FIG. 14, the information processing system 1 determines the combination of the types of the input to the block BL1 as the combination of the types corresponding to the data IDT1.

Then, the information processing system 1 adds a new model to the model learned in a state where the number of blocks is one (Step S11). In a portion corresponding to "number of blocks=2" in FIG. 14, the information processing system 1 illustrates a model learned in a state where the number of blocks is two and the block BL1 and the block BL2 are included. The information processing system 1 learns a model including a block BL2 including module layers EL21 and EL22 and a block BL1. For example, the information processing system 1 may generate the model by fixing only the structure of the block BL1 and relearning the parameter. For example, the information processing system 1 may generate a model by fixing a combination of a structure and a type of the block BL1 and relearning a parameter such as a connection with (a module layer of) the block BL2. In FIG. 14, the information processing system 1 determines the combination of the types of the input to the block BL1 as the combination of the types corresponding to the data IDT2.

As described above, the information processing system 1 executes optimization in one block in order to determine the model structure. Then, the information processing system 1 adds one block (new block) having the same structure as the model with the highest accuracy (also referred to as "best model") to the block (optimized block) in parallel, and performs relearning. In this case, for the optimized block (learned block), the information processing system 1 may perform learning with the structure fixed, or may perform learning without fixing the structure. Furthermore, for the learned block, the information processing system 1 may perform learning with a combination of types fixed, or may perform learning without fixing a combination of types. In addition, for the learned block, the information processing system 1 may perform learning while fixing a hidden layer, or may perform learning without fixing a hidden layer.

For example, the information processing system 1 may repeat a process of learning a model by adding a new block by the above-described process. Then, in a case where the generated model exceeds the size upper limit value, the information processing apparatus 10 may generate the model M1 by ending the generation processing. In this manner, the information processing system 1 optimizes the combination of the types of each block BL. The accuracy of the model can be improved by increasing the number of blocks BL.

The information processing system 1 may generate a model by appropriately using an arbitrary search method. The information processing system 1 may generate a model on the basis of a genetic algorithm. For example, the information processing system 1 generates a plurality of models targeting a plurality of combination candidates having different combinations of types. The information processing system 1 may further generate a model by using combination candidates (inheritance candidates) corresponding to a predetermined number (for example, two) of models with high accuracy among the plurality of generated models. For example, the information processing system 1 may inherit some combinations of types from each of the inheritance candidates, and generate a model by using a type candidate to which a combination of types of the inheritance candidates has been copied. The information processing system 1 may generate a model to be finally used by repeating processing of generating a model by taking over the above-described combination of types of inheritance candidates.

Through the above-described processing, the information processing system 1 generates a model in which a combination of types corresponding to each block is determined by combination optimization based on a genetic algorithm. The information processing system 1 generates a model in which a combination of types corresponding to each block is determined by search based on a genetic algorithm.

Note that the above-described processing is merely an example, and the information processing system 1 may generate the model M1 by appropriately using an arbitrary learning method. For example, the information processing system 1 may generate the model M1 by an arbitrary method based on a genetic algorithm. For example, after determining the structure of the model M1, the information processing system 1 may generate the model M1 by determining a combination of types of data input to each block of the model M1. For example, after determining the structure of the model M1 as illustrated in FIG. 9, the information processing system 1 may determine a combination of types of data to be input to each of the plurality of blocks BL included in the model M1. For example, the configuration and the connection relationship of the module layers of the blocks BL1 to BL4 as illustrated in FIG. 9 may be determined with reference to a preset setting file or the like.

For example, the information processing system 1 may determine a combination of types of data used in each of the blocks BL1 to BL4 after determining the configuration and connection relationship of the module layers of the blocks BL1 to BL4 as illustrated in FIG. 9. For example, the information processing system 1 may measure the accuracy of the model M1 for each of a plurality of combinations of types for the block BL1, and repeat learning using a combination of types that has inherited use of some types from each of a predetermined number of combinations of types in descending order of the accuracy of the model M1. Then, the information processing system 1 may determine the final combination of types of the block BL1 by repeating the processing of inheriting the combination of types and measuring the accuracy of the model M1 a predetermined number of times.

As described above, the information processing system 1 executes optimization processing of the blocks in the lateral direction connected in parallel in the model and the type (attribute) of data used in each block. For example, the information processing system 1 determines the number of blocks of the model. The information processing system 1 determines the number of layers in a block. The information processing system 1 executes optimization processing of a combination of types (attributes) on the basis of a genetic algorithm. For example, the information processing system 1 masks a type (attribute) satisfying a predetermined condition in inference. In addition, the information processing system 1 connects the modules of the model. For example, the information processing system 1 connects an input of a block as an input between block modules. The information processing system 1 connects an input to a module of a block as an input to a module of another block.

Furthermore, the information processing system 1 selects a type (feature information) of data by learning on the basis of the genetic algorithm, and determines a type to be masked at the time of use. For example, the information processing system 1 may perform a search in consideration of a type to be masked. For example, the information processing system 1 may determine the masking type according to the usage mode in a plurality of patterns. For example, the information processing system 1 determines a masking type for each user. For example, the information processing system 1 determines a masking type for each user attribute. For example, the information processing system 1 determines a masking type for each purpose. As described above, the information processing system 1 may perform optimization for each type by fixing the model and changing only the masking type. Furthermore, for example, the information processing system 1 may search for a type (attribute) not used at the time of inference, determine a masking type not used at the time of inference for each block, and generate a masking table (non-expression table) indicating the masking type determined for each block. For example, the information processing system 1 may facilitate the immediately preceding fine tuning by relearning the expression table so as to determine (optimize) the type that is not used at the time of inference using the data for the last one hour.

7-4. Inference Example Using Model

Furthermore, the information processing apparatus 10 may execute inference processing using the generated model M1. For example, the information processing apparatus 10 may input input data corresponding to a target of the inference processing to the model M1 and execute the inference processing on the basis of the output information output by the model M1. In this case, the information processing apparatus 10 may mask some combinations of types of types corresponding to the block BL of the model M1 at the time of inference using the model M1.

For example, the information processing apparatus 10 may execute the inference processing while masking some combinations of types of types corresponding to the block BL1 of the model M1. For example, the information processing apparatus 10 may determine to mask the type #2 among the types used as inputs of the block BL1 of the model M1 illustrated in FIG. 11.

For example, the information processing apparatus 10 may determine a type to be masked (also referred to as a "masking type") on the basis of a predetermined criterion. In this case, the information processing apparatus 10 may execute the inference processing on the basis of the output information (output data) output by the model M1 by using data in which a masking type based on a predetermined criterion is masked as an input to the block BL of the model M1.

For example, the information processing apparatus 10 may determine the type to be masked for each block BL using a masking list that specifies which type is to be masked among the types used as inputs of each block BL of the model M1 illustrated in FIG. 11. For example, in a case where the masking list includes information designating masking of the type #4 of the block BL4, the information processing apparatus 10 may determine to mask the type #4 among the types used as the input of the block BL4 of the model M1.

Note that the information processing apparatus 10 may determine the masking type on the basis of an arbitrary criterion. The information processing apparatus 10 may determine the masking type according to the purpose of the inference processing. For example, the information processing apparatus 10 determines the masking type according to the user who is the target of the inference processing. For example, the information processing apparatus 10 may determine the type to be masked for each block BL of the model M1 using a masking list that specifies which type is to be masked for each attribute of the user. For example, the information processing apparatus 10 may determine the type to be masked for each block BL of the model M1 using a masking list in which a masking type is designated for each combination of user attributes of age and generation.

For example, in a case where the masking list includes information designating that the type #1 of the block BL3 is to be masked for a man in his twenties, and the input data is data corresponding to a man in his twenties, the information processing apparatus 10 may determine that the type #3 is to be masked among the types used as the input of the block BL3 of the model M1. In this case, the information processing apparatus 10 may perform the inference processing based on the output information (output data) output by the model M1 by using the data in which the type #3 is masked among the types used as the input of the block BL3 as the input to the block BL3 of the model M1.

Note that the above-described processing is merely an example, and the information processing apparatus 10 may determine the masking type on the basis of various criteria. For example, the information processing apparatus 10 may determine the masking type at the time of learning the model M1. In this case, the information processing apparatus 10 may determine the masking type using the masking list indicating the masking type determined at the time of learning the model M1. For example, the information processing apparatus 10 measures the accuracy of the model M1 using some types among a combination of types for each block BL of the model M1 as masking type candidates. The information processing apparatus 10 may measure the accuracy of the model M1 a predetermined number of times while changing the masking type candidate, and determine the type that is the masking type candidate when the accuracy is the best as the masking type.

8. Findings and Experimental Results

From here, findings and experimental results obtained based on the model generated by the above-described processing are illustrated.

8-1. Findings

Figures 15, 16:
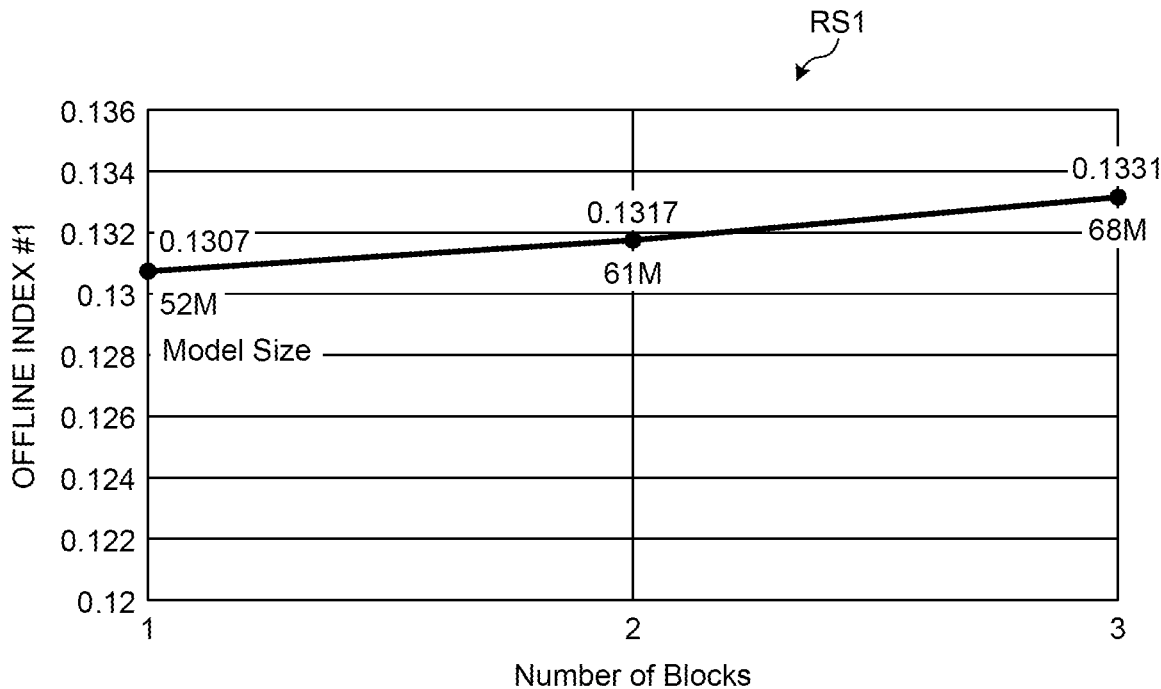
FIG. 15 is a graph relating to findings.
FIG. 16 is a diagram illustrating a list of experimental results.

First, findings will be described with reference to FIG. 15. FIG. 15 is a graph relating to findings. Specifically, the horizontal axis of the graph RS1 of FIG. 15 indicates the number of blocks, and the vertical axis indicates the accuracy. The findings indicate findings obtained from experiments (measurements) on the relationship between the number of blocks and accuracy. For example, the findings indicate a result when a model (hereinafter, also referred to as a "target model") is generated while increasing the number of blocks, and the accuracy of the target model is measured. Note that, in the generation of the target model, optimization processing of a combination of types of data used in the block to be written is also performed as described above.

FIG. 15 illustrates a case where the index serving as the reference of the accuracy of the model is "offline index #1". "Offline index #1" in FIG. 15 indicates an index serving as a reference of the accuracy of the model. The offline index #1 indicates a ratio in which candidates are extracted in descending order of scores output by the model and correct answers are included in the extracted candidates. For example, the offline index #1 indicates a ratio in which the behavior data of the user is input to the model, five target books are extracted in descending order of the score output by the model among target books, and books actually browsed by the user (for example, content such as a corresponding page) are included in the five target books. That is, the larger the value of the offline index #1 is, the higher the performance (inference accuracy) of the model is.

The experimental result illustrated in FIG. 15 indicates a change in the value of the offline index #1 when the number of blocks included in the target model is increased to 1, 2, and 3. The number in the vicinity of each plot in FIG. 15 indicates the size (model size) of the target model in the number of corresponding blocks. Specifically, a case where the number of blocks is "1" indicates that the size of the target model is 52 M, a case where the number of blocks is "2" indicates that the size of the target model is 61 M, and a case where the number of blocks is "3" indicates that the size of the target model is 68 M.

As illustrated in a graph RS1 of FIG. 15, it is indicated that there is a correlation between the number of blocks and the accuracy. Specifically, as illustrated in the graph RS1 of FIG. 15, it is indicated that the accuracy is improved as the number of blocks increases. As described above, it is indicated that the accuracy is improved by increasing the number of blocks while optimizing the combination of types.

8-2. Experimental Results

Figures 17, 18:
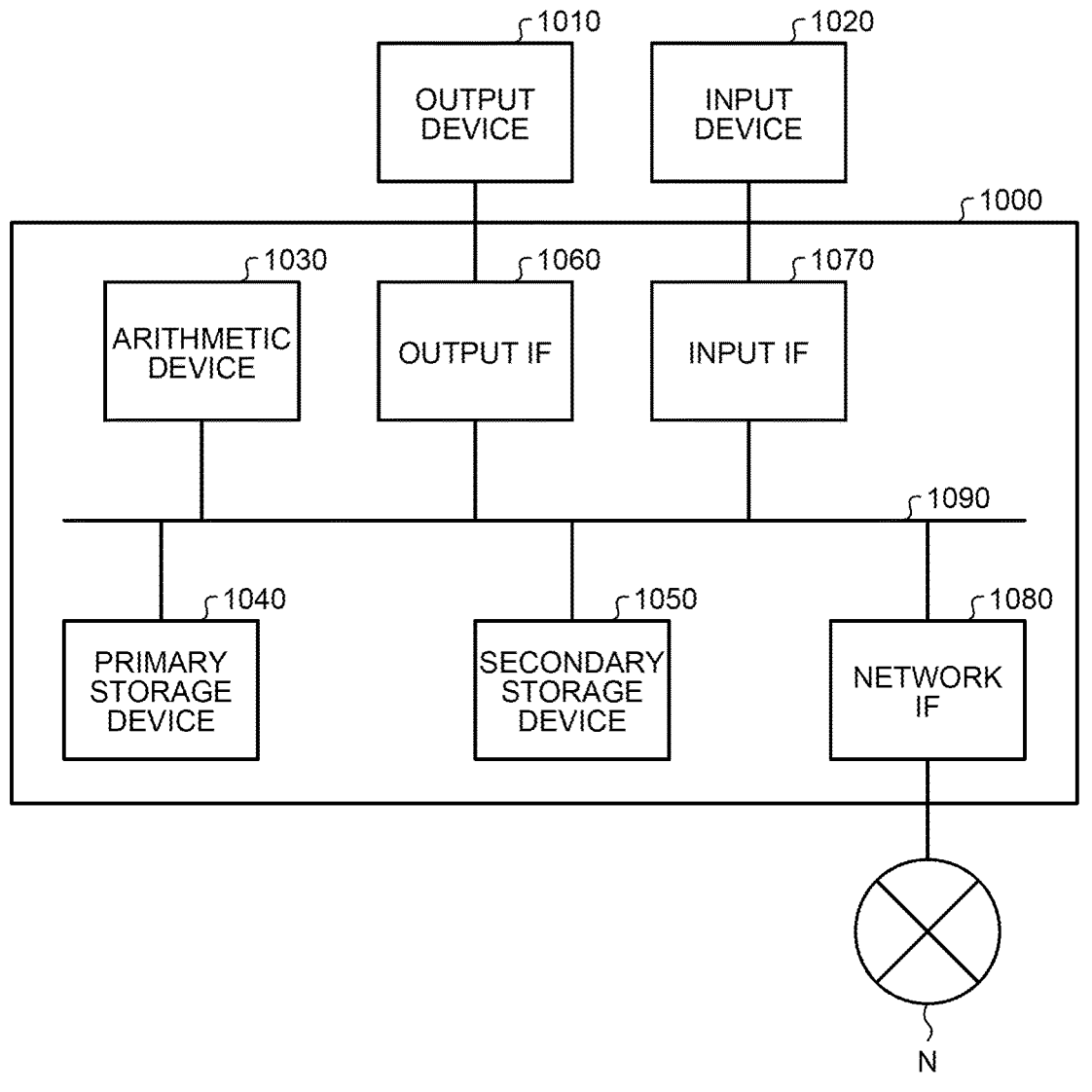
FIG. 17 is a diagram illustrating a list of experimental results.
FIG. 18 is a diagram illustrating an example of a hardware configuration.

An example of experimental results will be described with reference to FIGS. 16 and 17. FIGS. 16 and 17 are diagrams illustrating a list of experimental results. For example, FIG. 16 illustrates evaluation results in the multi-class classification task using actual service data. In addition, FIG. 17 illustrates evaluation results in the binary classification task using actual service data.

8-2-1. Multi-Class Classification

FIG. 16 illustrates experimental results in a case where data sets #1 to #4 of four services of services A, B, C, and D are used. Note that, although the services A, B, C, and D are represented by abstract names such as the services A, B, C, and D, the services A, B, C, and D are specific services such as an information providing service, a book selling service, and a travel service. For example, the service A is a so-called Q & A service (information providing service), the service B is a web version book selling service, the service C is an application version book selling service, and the service D is a travel service. For example, the experimental result corresponding to the service A is a result related to extraction of a question matching the responder, and the experimental result corresponding to each of the services B to D is a result related to recommendation in each corresponding service. Note that description of the same points as those described above will be omitted as appropriate.

FIG. 16 illustrates a case where the index serving as the reference of the accuracy of the model is the "offline index #1". In the list in FIG. 16, "conventional example #1" indicates a first conventional example. Furthermore, in the list in FIG. 16, "present technique" indicates the accuracy of the model generated by the above-described processing.

The values illustrated in the respective columns of the experimental results illustrated in FIG. 16 indicate the accuracy in the case of using the corresponding data set for each technique. For example, "0.35335" written in the column corresponding to "conventional example #1" and "data set #1 (service A)" indicates that the accuracy of conventional example #1 for the data set #1 of the service A is 0.35335. Furthermore, "0.13294" written in the column corresponding to "conventional example #1" and "data set #2 (service B)" indicates that the accuracy of conventional example #1 for the data set #2 of the service B is 0.13294.

In addition, "0.48592" written in the column corresponding to "present technique" and "data set #1 (service A)" indicates that the accuracy of the present technique for the data set #1 of the service A is 0.48592. Furthermore, "0.16565" written in the column corresponding to "present technique" and "data set #2 (service B)" indicates that the accuracy of the present technique for the data set #2 of the service B is 0.16565.

In addition, the numerical values illustrated in the columns corresponding to "Performance Improvement Rate" indicates the rates of improvement in accuracy from "conventional example #1" in a case where the "present technique" is adopted. For example, "+37.6%" written in the column corresponding to "Performance Improvement Rate" and "data set #1 (service A)" indicates that the accuracy of the present technique is improved by 37.6% from the conventional example #1 for the data set #1 of the service A. Furthermore, "+24.6%" written in the column corresponding to "Performance Improvement Rate" and "data set #2 (service B)" indicates that the accuracy of the present technique is improved by 24.6% from the conventional example #1 for the data set #2 of the service A.

Similarly, for the data set #3 of the service C, the present technique illustrates that the accuracy is improved by 23.0% as compared with the conventional example #1. Furthermore, for the data set #4 of the service D, the present technique indicates that the accuracy is improved by 24.3% as compared with the conventional example #1. As illustrated in FIG. 16, in the present technique, in the multi-class classification task, improvement (increase) in accuracy is observed from conventional example #1.

8-2-2. Binary Classification

FIG. 17 illustrates experimental results in a case where data sets #5 and #6 of two services of services E and F are used. Note that, although the services E and F are represented by abstract names such as the services E and F, the services E and F are specific services such as an information providing service, a book selling service, and a travel service. For example, the service E is a shopping service, and the service F is an information providing service on a portal site. For example, the experimental result corresponding to the service E is a result related to prediction of a CTR (click rate) of an advertisement, and the experimental result corresponding to the service F is a result related to selection of an article to be displayed in a predetermined display column of the portal site. Note that description of the same points as those described above will be omitted as appropriate.

FIG. 17 illustrates a case where the index serving as the reference of the accuracy of the model is "AUC". Thus, FIG. 17 illustrates a case where the accuracy of the model is evaluated on the basis of the area under the curve (AUC).

That is, in FIG. 17, the larger the value of AUC, the higher the performance (inference accuracy) of the model. In the list in FIG. 17, "conventional example #1" indicates a first conventional example. Furthermore, in the list in FIG. 17, "present technique" indicates the accuracy of the model generated by the above-described processing.

The values illustrated in the respective columns of the experimental results illustrated in FIG. 17 indicate the accuracy in the case of using the corresponding data set for each technique. For example, "0.7812" written in the column corresponding to "conventional example #1" and "data set #5 (service E)" indicates that the accuracy of conventional example #1 for the data set #5 of the service E is 0.7812. Furthermore, "0.8484" written in the column corresponding to "conventional example #1" and "data set #6 (service F)" indicates that the accuracy of conventional example #1 for the data set #6 of the service F is 0.8484.

Furthermore, "0.7846" written in the column corresponding to "present technique" and "data set #5 (service E)" indicates that the accuracy of the present technique for the data set #5 of the service E is 0.7846. Furthermore, "0.8545" written in the column corresponding to "present technique" and "data set #6 (service F)" indicates that the accuracy of the present technique for the data set #6 of the service F is 0.8545.

In addition, the numerical values illustrated in the columns corresponding to "Performance Improvement Rate" indicates the rates of improvement in accuracy from "conventional example #1" in a case where the "present technique" is adopted. For example, "+0.44%" written in the column corresponding to "Performance Improvement Rate" and "data set #5 (service E)" indicates that the accuracy of the present technique is improved by 0.44% from the conventional example #1 for the data set #5 of the service E. In addition, "+0.72%" written in the column corresponding to "Performance Improvement Rate" and "data set #6 (service F)" indicates that the accuracy of the present technique is improved by 0.72% from the conventional example #1 for the data set #6 of the service F.

As illustrated in FIG. 17, in the present technique, in the binary classification task, improvement (increase) in accuracy is observed from conventional example #1. For example, in the binary classification task, it is difficult to obtain a significant improvement in accuracy with a sparse classification model (also referred to as a "sparse model") or the like such as a sparse classifier model as compared with the multi-class classification task.

Here, a generalization error in a model such as a neural network such as a DNN can be decomposed into an approximation error that is an error related to the expressive power of the model (also referred to as "first error"), a complexity error that is an error related to the size of the model (also referred to as "second error"), and an optimization error that is an error related to the learning of the model (also referred to as "third error"). Generally, a binary classification task has a smaller complexity error than a multi-class classification task. Therefore, in the binary classification task, it may be difficult to obtain the accuracy improvement obtained in the multi-class classification task only by reducing the second error (complexity error).

Therefore, in the binary classification task, it is expected to obtain a large improvement in accuracy by reducing the first error (approximation error) and the third error (optimization error). The first error (approximation error) related to the expressive power of the model can be reduced by reducing the number of dimensions of the feature space corresponding to the model. Therefore, even in the binary classification task, it is expected to obtain accuracy improvement by reducing the number of dimensions of the feature space corresponding to the model.

In the "present technique", the first error (approximation error) and the third error (optimization error) can be reduced by the configuration of the model described above, and the accuracy can be improved. For example, in the "present technique", by configuring a model having a plurality of blocks, the number of dimensions of the feature space corresponding to the model can be reduced, and the first error (approximation error) can be reduced.

As illustrated in FIGS. 16 and 17, in the present technique, the accuracy is improved (increased) from conventional example #1 regardless of whether the classification is multi-class classification or binary classification. That is, as illustrated in FIGS. 16 and 17, the accuracy of the present technique is improved (increased) from conventional example #1.

9. Modification

An example of the information processing has been described above. However, the embodiment is not limited thereto. Hereinafter, a modification of the provision process will be described.

9-1. Device Configuration

In the above embodiment, an example has been described in which the information processing system 1 includes the information processing apparatus 10 that generates the generation index and the model generation server 2 that generates the model in accordance with the generation index, but the embodiment is not limited thereto. For example, the information processing apparatus 10 may have a function of the model generation server 2. Furthermore, the function exhibited by the information processing apparatus 10 may be included in the terminal device 3. In such a case, the terminal device 3 automatically generates the generation index and automatically generates the model using the model generation server 2.

9-2. Others

Among the processes described in the above embodiment, all or a part of the processes described as being automatically performed can be manually performed, or all or a part of the processes described as being manually performed can be automatically performed by a known method. In addition, the processing procedures, specific names, and information including various data and parameters illustrated in the document and the drawings can be arbitrarily changed unless otherwise specified. For example, the various types of information illustrated in each figure are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

In addition, the above-described embodiment can be appropriately combined as long as the processing contents do not contradict each other.

38

9-3. Program

Furthermore, the information processing apparatus 10 according to the above-described embodiment is implemented by a computer 1000 having a configuration as illustrated in FIG. 18, for example. FIG. 18 is a diagram illustrating an example of a hardware configuration. The computer 1000 is connected to an output device 1010 and an input device 1020, and has a form in which an arithmetic device 1030, a primary storage device 1040, a secondary storage device 1050, an output interface (IF) 1060, an input IF 1070, and a network IF 1080 are connected by a bus 1090.

The arithmetic device 1030 operates on the basis of a program stored in the primary storage device 1040 or the secondary storage device 1050, a program read from the input device 1020, or the like, and executes various processes. The primary storage device 1040 is a memory device such as a RAM that temporarily stores data used for various arithmetic operations by the arithmetic device 1030. The secondary storage device 1050 is a storage device in which data used for various arithmetic operations by the arithmetic device 1030 and various databases are registered, and is implemented by a read only memory (ROM), an HDD, a flash memory, and the like.

The output IF 1060 is an interface for transmitting information to be output to the output device 1010 that outputs various types of information such as a monitor and a printer, and is implemented by, for example, a connector of a standard such as a universal serial bus (USB), a digital visual interface (DVI), or a high definition multimedia interface (HDMI) (registered trademark). Furthermore, the input IF 1070 is an interface for receiving information from various input devices 1020 such as a mouse, a keyboard, and a scanner, and is implemented by, for example, a USB or the like.

Note that the input device 1020 may be, for example, a device that reads information from an optical recording medium such as a compact disc (CD), a digital versatile disc (DVD), or a phase change rewritable disk (PD), a magneto-optical recording medium such as a magneto-optical disk (MO), a tape medium, a magnetic recording medium, a semiconductor memory, or the like. Furthermore, the input device 1020 may be an external storage medium such as a USB memory.

The network IF 1080 receives data from another device via the network N and transmits the data to the arithmetic device 1030, and transmits data generated by the arithmetic device 1030 to another device via the network N.

The arithmetic device 1030 controls the output device 1010 and the input device 1020 via the output IF 1060 and the input IF 1070. For example, the arithmetic device 1030 loads a program from the input device 1020 or the secondary storage device 1050 onto the primary storage device 1040, and executes the loaded program.

For example, in a case where the computer 1000 functions as the information processing apparatus 10, the arithmetic device 1030 of the computer 1000 implements the function of the control unit 40 by executing a program loaded on the primary storage device 1040.

10. Effects

As described above, the information processing apparatus 10 includes: an acquisition unit (in the embodiment, the acquisition unit 41) configured to acquire learning data used for learning of a model (for example, the model M1 in the embodiment) including a plurality of blocks including a first block (for example, the block BL1 in the embodiment) to which an output from a first input layer (for example, the input layer EL10 in the embodiment) is input and a second block (for example, the block BL2 in the embodiment) to which an output from a second input layer (for example, the input layer EL20 in the embodiment) different from the first input layer is input, the learning data including a plurality of types of information; and a generation unit (in the embodiment, the generation unit 441 configured to select a type included in data input to each of the plurality of blocks in learning using the learning data, and generate the model by using first data in which a combination of types selected among the plurality of types is a first combination as an input from the first input layer to the first block and second data in which a combination of types selected is a second combination as an input from the second input layer to the second block. As a result, the information processing apparatus 10 can generate a model that can flexibly use input data.

In addition, the generation unit generates a model in which the first combination of the types included in the first data input from the first input layer to the first block and the second combination of the types included in the second data input from the second input layer to the second block are different. As a result, since the information processing apparatus 10 can arbitrarily select the type of data used in each block, it is possible to generate a model that can flexibly use the input data.

In addition, the generation unit generates a model in which the first data of the first combination is input to the first block and the second data of the second combination is input to the second block by processing for optimizing a combination of types included in data input to each of the plurality of blocks. As a result, the information processing apparatus 10 can generate a model that can flexibly use input data by processing for optimizing a combination of types.

In addition, the generation unit generates a model in which the first data of the first combination is input to the first block and the second data of the second combination is input to the second block by processing based on a genetic algorithm. As a result, the information processing apparatus 10 can generate a model that can flexibly use input data by processing based on the genetic algorithm.

In addition, the generation unit generates a model in which the number of modules included in the first block is a first number and the number of modules included in the second block is a second number. As a result, the information processing apparatus 10 can generate a plurality of models in which the number of modules can be arbitrarily determined, and can generate a model that can flexibly use input data.

In addition, the generation unit generates a model having a first block including a first number of modules and a second block including a second number of modules different from the first number. As a result, the information processing apparatus 10 can generate a plurality of models in which the number of modules can be arbitrarily determined, and can generate a model that can flexibly use input data.

In addition, the type is an attribute to which the information included in the learning data corresponds. In this manner, the information processing apparatus 10 can select the type to be used for processing for each block among the types that are the attributes to which the information included in the learning data corresponds, and can generate a model that can flexibly use the input data.

In addition, the type includes a category to which the learning data belongs. In this manner, the information processing apparatus 10 can select the type to be used for processing for each block among the types including the categories to which the learning data belongs, and can generate a model that can flexibly use the input data.

In addition, when the learning data is a transaction history of a transaction target, the type includes a type related to the transaction target. In this manner, the information processing apparatus 10 can select a type to be used for processing for each block among types including a type related to a transaction target, and can generate a model that can flexibly use input data.

In addition, when the learning data is a transaction history of a transaction target, the type includes a type related to a provider of the transaction target. In this manner, the information processing apparatus 10 can select a type to be used for processing for each block among types including a type related to a provider of a transaction target, and can generate a model that can flexibly use input data.

Although some of the embodiments of the present application have been described in detail with reference to the drawings, these are merely examples, and the present invention can be implemented in other forms subjected to various modifications and improvements based on the knowledge of those skilled in the art, including the aspects described in the disclosure of the invention.

In addition, "parts (sections, modules, units)" described above can be read as "means", "circuits", or the like. For example, the acquisition unit can be replaced with an acquisition means or an acquisition circuit.

EXPLANATIONS OF LETTERS OR NUMERALS

1 Information processing system
2 Model generation server
3 Terminal device
10 Information processing apparatus
20 Communication unit
30 Storage unit
40 Control unit
41 Acquisition unit
42 Determination unit
43 Reception unit
44 Generation unit
45 Processing unit (inference unit)
46 Providing unit

The invention claimed is:

1. An information processing apparatus comprising:
an acquisition unit configured to acquire learning data used for learning of a model having a plurality of blocks including a first block to which an output from a first input layer is input and a second block to which an output from a second input Layer different from the first input layer is input, the learning data including a plurality of types of information; and
a generation unit configured to select a type included in data input to each of the plurality of blocks in learning using the learning data by processing based on a genetic algorithm, and generate the model by using first data in which a combination of types selected among the plurality of types is a first combination as an input from the first input layer to the first block and second data in which a combination of types selected is a second combination as an input from the second input layer to the second block, wherein the first combination and the second combination are different.

2. An information processing method executed by a computer, the information processing method comprising:

acquiring learning data used for learning of a model having a plurality of blocks including a first block to which an output from a first input layer is input and a second block to which an output from a second input layer different from the first input layer is input, the learning data including a plurality of types of information; and selecting a type included in data input to each of the plurality of blocks in learning using the learning data by processing based on a genetic algorithm, and generating the model by using first data in which a combination of types selected among the plurality of types is a first combination as an input from the first input layer to the first block and second data in which a combination of types selected is a second combination as an input from the second input layer to the second block, wherein the first combination and the second combination are different.

3. The information processing method according to claim 1, further comprising generating the model in which the first data of the first combination is input to the first block and the second data of the second combination is input to the second block by processing for optimizing a combination of types included in data input to each of the plurality of blocks.

4. The information processing method according to claim 2, further comprising generating the model in which the number of modules included in the first block is a first number and the number of modules included in the second block is a second number.

5. The information processing method according to claim 4, further comprising generating the model including the first block including the first number of modules and the second block including the second number of modules different from the first number.

6. The information processing method according to claim 2, wherein the type is an attribute corresponding to information included in the learning data.

7. The information processing method according to claim 2, wherein the type includes a category to which the learning data belongs.

8. The information processing method according to claim 2, wherein when the learning data is a transaction history of a transaction target, the type includes a type related to the transaction target.

9. The information processing method according to claim 2, wherein when the learning data is a transaction history of a transaction target, the type includes a type related to a provider of the transaction target.

10. A non-transitory computer-readable storage medium having stored therein an information processing program for causing a computer to execute:

acquiring learning data used for learning of a model having a plurality of blocks including a first block to which an output from a first input layer is input and a second block to which an output from a second input layer different from the first input layer is input, the learning data including a plurality of types of information; and selecting a type included in data input to each of the plurality of blocks in learning using the learning data by processing based on a genetic algorithm, and generating the model by using first data in which a combination of types selected among the plurality of types is a first combination as an input from the first input layer to the first block and second data in which a combination of types selected is a second combination as an input from the second input layer to the second block, wherein the first combination and the second combination are different.

* * * * *